United States Patent [19]

Rau et al.

[11] Patent Number: 5,226,128

[45] Date of Patent: * Jul. 6, 1993

[54] HORIZONTAL COMPUTER HAVING REGISTER MULTICONNECT FOR EXECUTION OF A LOOP WITH A BRANCH

[75] Inventors: Bantwal R. Rau, Los Gatos; Ross A. Towle, Union City; David W. Yen, Cupertino, all of Calif.

[73] Assignee: Hewlett-Packard Company, Palo Alto, Calif.

[ * ] Notice: The portion of the term of this patent subsequent to Jul. 30, 2008 has been disclaimed.

[21] Appl. No.: 677,600

[22] Filed: Mar. 27, 1991

Related U.S. Application Data

[63] Continuation of Ser. No. 45,896, May 1, 1987, abandoned.

[51] Int. Cl.$^5$ .................... G06F 9/345; G06F 9/38
[52] U.S. Cl. .................... 395/375; 364/229.2; 364/261.3; 364/262.1; 364/262; 364/229; 364/DIG. 1; 364/931.41; 364/938; 364/946.8; 364/948.3; 364/946.2; 364/931.4; 364/DIG. 2
[58] Field of Search ... 364/200 MS File, 900 MS File, 364/DIG. 1, DIG. 2; 395/375, 800

[56] References Cited

U.S. PATENT DOCUMENTS

| | | | |
|---|---|---|---|
| 4,031,521 | 6/1977 | Hall | 364/200 |
| 4,037,213 | 7/1977 | Atkins | 364/200 |
| 4,166,289 | 8/1979 | Murtha | 364/200 |
| 4,292,667 | 9/1981 | Catiller | 364/200 |
| 4,310,879 | 1/1982 | Pandeya | 364/200 |
| 4,400,768 | 8/1983 | Tomlinson | 364/200 |
| 4,462,074 | 7/1984 | Linde | 364/200 |
| 4,466,061 | 8/1984 | DeSantis et al. | 364/200 |
| 4,553,203 | 11/1985 | Rau et al. | 364/200 |
| 4,556,938 | 12/1985 | Parker | 364/200 |
| 4,594,655 | 6/1986 | Hao et al. | 364/200 |
| 4,720,780 | 6/1988 | Dolecek | 364/200 |
| 4,727,483 | 2/1988 | Saxe | 364/200 |
| 4,740,894 | 4/1988 | Lyon | 364/200 |

OTHER PUBLICATIONS

B. R. Rau, C. D. Glaeser, "Some Scheduling Techniques And An Easily Schedulable Horizontal Architecture For High Performance Scientific Computing", IEEE 1981 pp. 183-198.

B. Ramakrishna Rau, Christopher D. Glaeser, Raymond L. Picard, "Efficient Code Generation For Horizontal Architectures: Compiler Techniques And Architectural Support", IEEE 1982, pp. 131-139.

*Primary Examiner*—David L. Clark
*Assistant Examiner*—Maria N. Von Buhr

[57] ABSTRACT

A horizontal computer for execution of an instruction loop with a branch. The computer includes parallel processors, a multiconnect unit for storing operands for the processors, and instruction unit for specifying address offsets and operations to be performed by the processors, and an invariant address unit for combining the address offsets with a modifiable pointer to form source and destination addresses in the multiconnect unit. The instruction unit enables different ones of the processors both as a function of whether a branch instruction is to be executed and as a function of which iteration of the loop is being executed. The processors are enabled by processor control circuitry or by selectively providing instructions to the processors so that different operations are performed during different iterations.

7 Claims, 9 Drawing Sheets

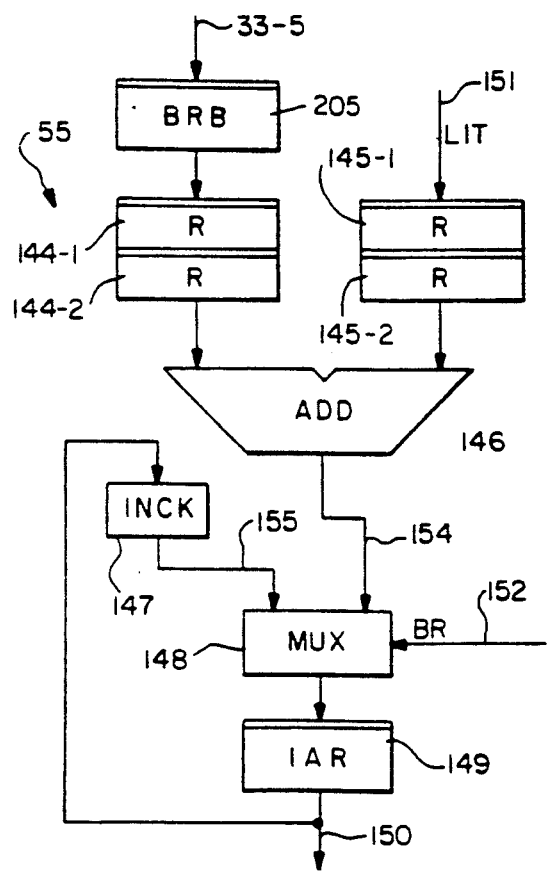
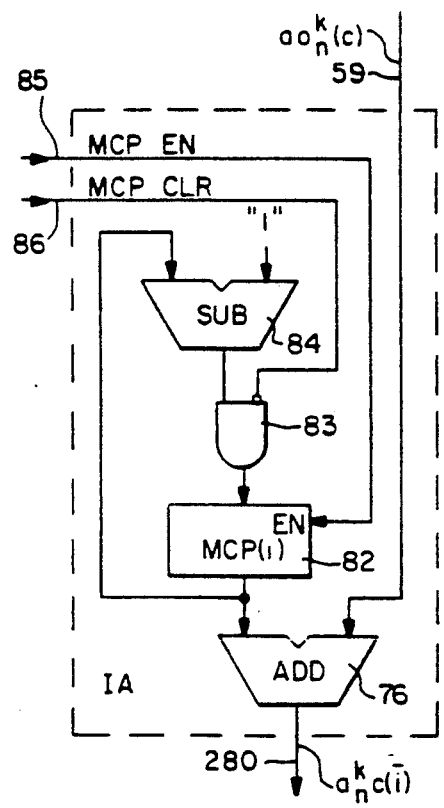
FIG.-5    FIG.-6
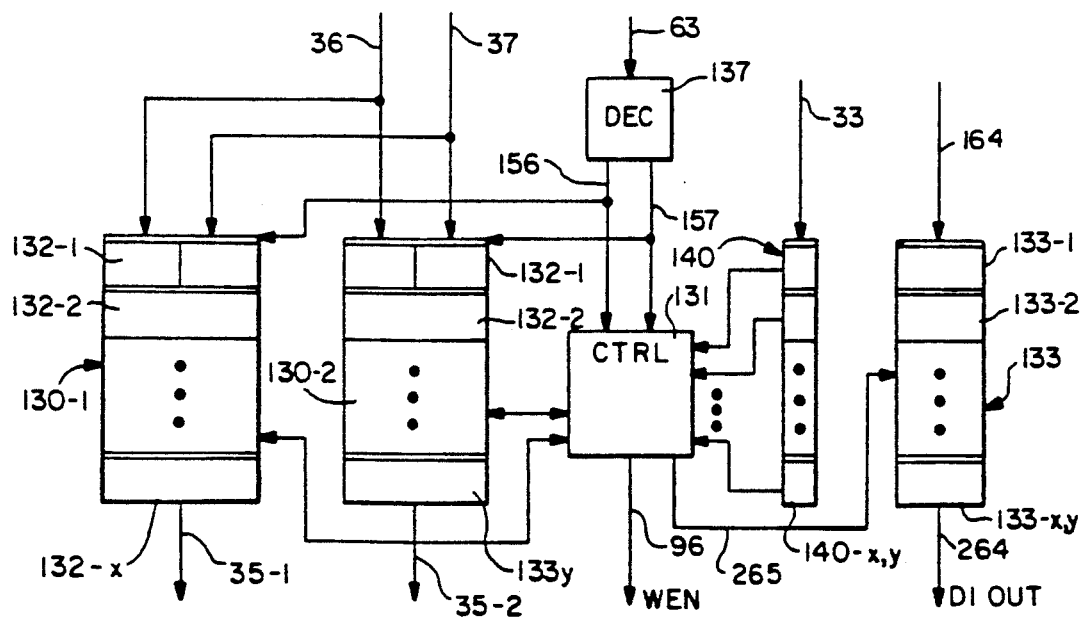
FIG.-7

HORIZONTAL COMPUTER HAVING REGISTER MULTICONNECT FOR EXECUTION OF A LOOP WITH A BRANCH

CROSS REFERENCE TO RELATED APPLICATION

This is a continuation of copending application Ser. No. 07/045,896 filed on May 1, 1987, now abandoned.

CROSS-REFERENCE TO RELATED APPLICATIONS

This application is related to the following applications:

Ser. No. 07/445,136 (filed Nov. 30, 1989) which is a continuation of Ser. No. 07/296,415 (abandoned) which in turn is a continuation of Ser. No. 07/045,895 (abandoned);

Ser. No. 07/456,627 (filed Dec. 21, 1989), now U.S. Pat. No. 5,083,267 (issued Jan. 21, 1992), which is a continuation of Ser. No. 07/296,391 (abandoned) which in turn is a continuation of Ser. No. 07/045,883 (abandoned);

Ser. No. 07/462,301 (filed Dec. 20, 1989), now U.S. Pat. No. 5,121,502 (issued Jun. 9, 1992), which is a continuation of Ser. No. 07/296,416 (abandoned) which in turn is a continuation of Ser. No. 07/045,882 (abandoned); and Ser. No. 07/342,649 (filed Apr. 24, 1989), now U.S. Pat. No. 5,036,454 (issued Jul. 30, 1991), which is a continuation of Ser. No. 07/045,884 (abandoned).

BACKGROUND OF INVENTION

The present invention relates to computers, and more particularly, to high-speed, parallel-processing computers employing horizontal architectures.

Typical examples of computers are the IBM 360/370 Systems. In such systems, a series of general purpose registers (GPRs) are accessible to supply data to an arithmetic and logic unit (ALU). The output from the arithmetic and logic unit in turn supplies results from arithmetic and logic operations to one or more of the general purpose registers. In a similar manner, some 360/370 Systems include a floating point processor (FPP) and include corresponding floating point registers (FPRs). The floating point registers supply data to the floating point processor and, similarly, the results from the floating point processor are stored back into one or more of the floating point registers. The types of instructions which employ either the GPRs or the FPRs are register to register (RR) instructions. Frequently, in the operation of the GPRs and the FPRs for RR instructions, identical data is stored in two or more register locations. Accordingly, the operation of storing data into the GPRs is selectively to one or more locations. Similarly, the input to the ALU frequently is selectively from one or more of many locations storing the same data.

Horizontal processors have been proposed for a number of years. See for example, "SOME SCHEDULING TECHNIQUES AND AN EASILY SCHEDULABLE HORIZONTAL ARCHITECTURE FOR HIGH PERFORMANCE SCIENTIFIC COMPUTING" by B. R. Rau and C. D. Glaeser, *IEEE Proceedings of the 14th Annual Microprogramming Workshop*, October 1981, pp. 183–198 Advanced Processor Technology Group ESL, Inc., San Jose, Calif., and "EFFICIENT CODE GENERATION FOR HORIZONTAL ARCHITECTURES:COMPILER TECHNIQUES AND ARCHITECTURAL SUPPORT" BY B. Ramakrishna Rau, Christopher D. Glaeser and Raymond L. Picard, IEEE 9th Annual Symposium on Computer Architecture 1982, pp. 131-139.

Horizontal architectures have been developed to perform high speed scientific computations at a relatively modest cost. The simultaneous requirements of high performance and low cost lead to an architecture consisting of multiple pipelined processing elements (PEs), such as adders and multipliers, a memory (which for scheduling purposes may be viewed as yet another PE with two operations, a READ and WRITE), and an interconnect which ties them all together.

The interconnect allows the result of one operation to be directly routed to one of the inputs for another processing element where another operation is to be performed. With such an interconnect the required memory bandwidth is reduced since temporary values need not be written to and read from the memory. Another aspect typical of horizontal processors is that their program memories emit wide instructions which synchronously specify the actions of the multiple and possibly dissimilar processing elements. The program memory is sequenced by a sequencer that assumes sequential flow of control unless a branch is explicitly specified.

As a consequence of their simplicity, horizontal architectures are inexpensive when considering the potential performance obtainable. However, if this potential performance is to be realized, the multiple resources of a horizontal processor must be scheduled effectively. The scheduling task for conventional horizontal processors is quite complex and the construction of highly optimizing compilers for them is difficult and expensive.

The polycyclic architecture has been designed to support code generation by simplifying the task of scheduling the resources of horizontal processors. The advantages are 1) that the scheduler portion of the compiler will be easier to implement, 2) that the code generated will be of a higher quality, 3) that the compiler will execute fast, and 4) that the automatic generation of compilers will be facilitated.

The polycyclic architecture is a horizontal architecture that has unique interconnect and delay elements. The interconnect element of a polycyclic processor has a dedicated delay element between every directly connected resource output and resource input. This delay element enables a datum to be delayed by an arbitrary amount of time in transit between the corresponding output and input.

The topology of the interconnect may be arbitrary. It is possible to design polycyclic processors with n resources in which the number of delay elements is O(n), (a uni- or multi-bus structure), O(nlogn), (e.g. delta networks) or O(n*n), (a cross-bar). The trade-offs are between cost, interconnect bandwidth and interconnect latency. Thus, it is possible to design polycyclic processors lying in various cost-performance brackets.

In previously proposed polycyclic processors, the structure of an individual delay element consists of a register file, any location of which may be read by providing an explicit read address. Optionally, the value accessed can be deleted. This option is exercised on the last access to that value. The result is that every value with addresses greater than the address of the deleted value is simultaneously shifted down, in one machine cycle, to the location with the next lower address. Consequently, all values present in the delay element are compacted into the lowest locations. An incoming value is written into the lowest empty location which is always pointed to by the Write Pointer that is maintained by hardware. The Write Pointer is automatically incremented each time a value is written and is decremented each time one is deleted. As a consequence of deletions, a value, during its residence in the delay element, drifts down to lower addresses, and is read from various locations before it is itself deleted.

A value's current position at each instant during execution must be known by the compiler so that the appropriate read address may be specified by the program when the value is to be read. Keeping track of this position is a tedious task which must be performed by a compiler during code-generation.

To illustrate the differences, two processors, a conventional horizontal processor and a polycyclic processor, are compared. A typical horizontal processor contains one adder and one multiplier, each with a pipeline stage time of one cycle and a latency of two cycles. It also contains two scratch-pad register files labeled A and B. The interconnect is assumed to consist of a delayless cross-bar with broadcast capabilities, that is, the value at any input port may be distributed to any number of the output ports simultaneously. Each scratch-pad is assumed to be capable of one read and one write per cycle. A read specified on one cycle causes the datum to be available at the output ports of the interconnect on the next cycle. If a read and a write with the same address are specified on the same scratch-pad on the same cycle, then the datum at the input of the scratch-pad during that cycle will be available at the output ports of the interconnect on the next cycle. In this manner, a delay of one or more cycles may be obtained in transmitting a value between the output of one processor and the input of another. The horizontal processor typically also contains other resources.

A typical polycyclic processor is similar to the horizontal processor except for the nature of the interconnect element and the absence of the two scratchpad register files. While the horizontal processor's interconnect is a crossbar, the polycyclic processor's interconnect is a crossbar with a delay element at each crosspoint. The interconnect has two output ports (columns) and one input port (row) for each of the two processing elements. Each cross-point has a delay element which is capable of one read and one write each cycle.

In previously proposed processors, a processor can simultaneously distribute its output to any or all of the delay elements which are in the row of the interconnect corresponding to its output port. A processor can obtain its input directly. If a value is written into a delay element at the same time that an attempt is made to read from the delay element, the value is transmitted through the interconnect with no delay. Any delay may be obtained merely by leaving the datum in the delay element for a suitable length of time.

In the polycyclic processors proposed, elaborate controls were provided for determining which delay element in a row actually received data as a result of a processor operation and the shifting of data from element to element. This selection process and shifting causes the elements in a row to have different data at different times. Furthermore, the removal of data from the different delay elements requires an elaborate process for purging the data elements at appropriate times. The operations of selecting and purging data from the data elements is somewhat cumbersome and is not entirely satisfactory.

Although the polycyclic and horizontal processors which have previously been proposed are an improvement over previously known systems, there still is a need for still additional improvements which increase the performance and efficiency of processors.

SUMMARY OF INVENTION

The present invention is embodied in a horizontal architecture computer system including a processing unit, a multiconnect unit, an instruction unit, and an invariant addressing unit which efficiently executes a loop of instructions with a branch in the loop; that is, a loop of instructions in which different ones of the instructions are executed in different iterations of the loop according to results obtained in previous iterations.

In response to each instruction in the loop, the processing unit performs operations on input operands and provides output operands. The multiconnect unit stores operands at address locations and provides the input operands to the processing unit from source addresses and stores the output operands from the processing unit at destination addresses. The instruction unit specifies operations to be performed by the processing unit and specifies address offsets of the operands in the multiconnect unit relative to pointers. The invariant addressing unit combines the pointers and the address offsets to form the actual addresses of operands in the multiconnect unit. The pointer is modified to advance the actual address locations accessed in the multiconnect unit. As each iteration of the loop is processed, the pointer changes so that the subsequent iterations may specify operands from previous iterations without need to change address offsets since the pointer changes for each iteration.

The multiconnect is a register array formed of memory circuits constituting a plurality of multiconnect elements organized in rows and columns. Each multiconnect element has addressable multiconnect locations for storing operands.

Each address offset, including the column source address offset and the row destination address offset, is specified relative to the multiconnect pointer (mcp) by an instruction.

The invariant addressing unit combines the instruction specified address offset with the multiconnect pointer to provide the actual address of the source or destination operand in the multiconnect array.

The multiconnect unit permits each processor to receive information from the output of any other processor at the same time while changing actual address locations by changing the pointer without changing the relative location of operands.

The instructions executed by the computer of the present invention are scheduled to make efficient use of the available processors and other resources in the system and to insure that no conflict exists for use of the resources of the system.

As a result of scheduling a program, an initial instruction stream, IS, of scheduled instructions is formed.

The initial instructions in the initial instruction stream, IS, are transformed to a transformed(or kernel) instruction stream, $\bar{\text{IS}}$, having Y transformed(kernel) instructions $\bar{I}_0, \bar{I}_1, \bar{I}_2, \bar{I}_3, \ldots, \bar{I}_k, \ldots, \bar{I}_{(Y-1)}$.

Each kernel instruction, $\bar{I}_k$, in the kernel instruction stream $\bar{I}_S$ is formed by a set of zero, one or more operations, $\bar{O}^{k,l}{}_0, \bar{O}^{k,l}{}_1, \bar{O}^{k,l}{}_2, \ldots, \bar{O}^{k,l}{}_n, \ldots, \bar{O}^{k,l}{}_{(N-1)}$, initiated concurrently where N is the number of processors for performing operations and where the kernel operation, $\overline{O}^{k,l}{}_n$, is performed by the $n^{th}$-processor in response to the $k^{th}$-kernel instructions.

An initial instruction stream, IS, is frequently of the type having a loop, LP, in which the L instructions forming the loop are repeatedly executed a number of times, R, during the processing of the instruction stream. After transformation, an initial loop, LP, is converted to a kernel loop, KE, of K kernel instructions $\bar{I}_0, \bar{I}_1, \bar{I}_2, \ldots, \bar{I}_k, \ldots, \bar{I}_{(K-1)}$ in which execution advances from $\bar{I}_0$ toward $\bar{I}_{K-1}$ one or more times, once for each execution of the kernel, KE.

If an output operand that is generated during execution of one iteration of a loop will be required as an input operand during a later iteration of the loop, that operand must be saved until it is needed. Storing that operand in the multiconnect unit at an address provided by the invariant addressing unit prevents the operand from being overwritten until it is needed because the multiconnect pointer, which is used by the invariant addressing unit to form the address of the operand, is modified at each successive iteration and therefore operands generated during different iterations are stored at different locations in the multiconnect unit.

Iteration control circuitry is provided for selectively controlling the operations of the kernel instructions. Different operations specified by each kernel instruction are initiated as a function of the particular iteration of the loop that is being performed. The iterations are partitioned into a prolog, body, and epilog. During successive prolog iterations, an increasing number of operations are performed, during successive body iterations, a constant number of operations are performed, and during successive epilog iterations, a decreasing number of operations are performed.

The iteration control circuitry includes controls for counting the iterations of a loop, the prolog iterations, the body iterations and the epilog iterations. In one particular embodiment, a loop counter counts the loops and an epilog counter counts the iterations during the epilog. An iteration control register is provided for controlling each processor to determine which operations are active during each iteration.

Accordingly, the present invention provides an improved computer for execution of a loop with a branch.

BRIEF DESCRIPTION OF DRAWINGS

FIG. 5 is a block diagram of the instruction address generator which forms part of the instruction unit of FIG. 4.

FIG. 6 is a block diagram of an invariant addressing unit which is utilized within the computer of FIGS. 2 and 3.

FIG. 7 depicts a schematic representation of a typical processor of the type employed within the processing unit of FIG. 2 or FIG. 3.

DETAILED DESCRIPTION

Figure 1:
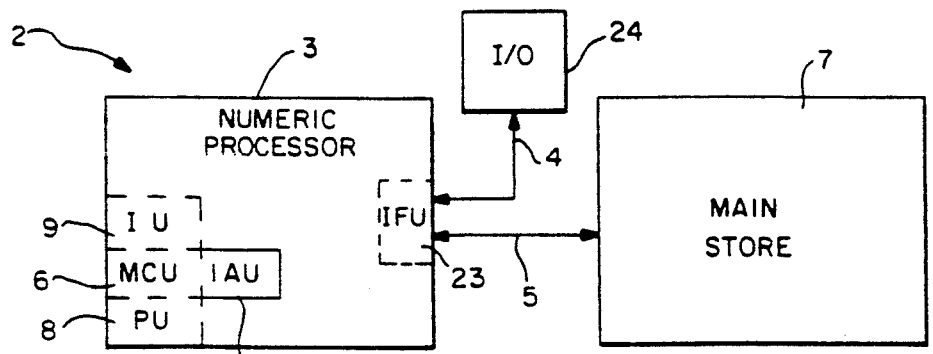
FIG. 1 is a block diagram of an overall system in accordance with the present invention.

Overall System—FIG. 1

In FIG. 1, a high performance, low-cost system 2 is shown for computation-intensive numeric tasks. The FIG. 1 system processes computation tasks in the numeric processor(NP) computer 3.

The computer 3 typically includes a processing unit(PU) 8 for computation-intensive task, includes an instruction unit(IU) 9 for the fetching, dispatching, and caching of instructions, includes a register-multiconnect unit (MCU) 6 for connecting data from and to the processing unit 8, and includes an interface unit(IFU) 23 for passing data to and from the main store 7 over bus 5 and to and from the I/O 24 over bus 4. In one embodiment, the interface unit 23 is capable of issuing two main store requests per clock for the multiconnect unit 6 and one request per clock for the instruction unit 9.

The computer 3 employs a horizontal architecture for executing an instruction stream, IS, fetched by the instruction unit 9. The instruction stream includes a number of instructions, $\bar{I}_0, \bar{I}_1, \bar{I}_2, \ldots, \bar{I}_k, \ldots, \bar{I}_{(K-1)}$ where each instruction, $\bar{I}_k$, of the instruction stream $\overline{IS}$ specifies one or more operations $\overline{O}^{k,l}{}_1, \overline{O}^{k,l}{}_2, \ldots, \overline{O}^{k,l}{}_n, \ldots, \overline{O}^{k,l}{}_N$, to be performed by the processing unit 8.

In one embodiment, the processing unit 8 includes a number, N, of parallel processors, where each processor performs one or more of the operations, $\overline{O}^{k,l}{}_n$. Each instruction from the instruction unit 9 provides source addresses (or source address offsets) for specifying the addresses of operands in the multiconnect unit 6 to the transferred to the processing unit 8. Each instruction from the instruction unit 9 provides destination addresses (or destination address offsets) for specifying the addresses in the multiconnect unit 6 to which result operands from the processing unit 8 are to be transferred. The multiconnect unit 6 is a register file where the registers are organized in rows and columns and where the registers are accessed for writing into in rows and are accessed for reading from in columns. The columns connect information from the multiconnect unit 6 to the processing unit 8 and the rows connect information from the processing unit to the multiconnect unit 6.

The instruction unit 9 uses invariant addressing to specify source and destination addresses in the multiconnect unit 6. The invariant addressing is carried out in invariant addressing units (IAU) 12 which store multiconnect pointers (mcp). The instructions provide addresses in the form of address offsets (ao) and the address offsets (ao) are combined with the multiconnect pointers (mcp) to form the actual source and destination addresses in the multiconnect unit 6. The addresses in the multiconnect unit are specified with mcp-relative addresses.

Instruction Scheduling

The execution of instructions by the computer of the present invention requires that the instructions of a program be scheduled, for example, by a compiler which compiles prior to execution time. The object of the scheduling is to make efficient use of the available processors and other resources in the system and to insure that no conflict exists for use of the resources of the system. In general, each functional unit (processor) can be requested to perform only a single operation per cycle and each bus can be requested to make a single transfer per cycle. Scheduling attempts to use, at &:he same time, as many of the resources of the system as possible without creating conflicts so that execution will be performed in as short a time as possible.

As a result of scheduling a program, an initial instruction stream, IS, of scheduled instructions is formed and is defined as the Z initial instruction $I_0, I_1, I_2, I_3, \ldots, I_l, \ldots, I_{(Z-1)}$ where $0 \leq l \leq (Z-1)$. The scheduling to form the initial instruction stream, IS, can be performed using any well-known scheduling algorithm. For example, some methods for scheduling instructions are described in the publications listed in the above BACKGROUND OF INVENTION.

Each initial instruction, $I_l$, in the initial instruction stream is formed by a set of zero, one or more operations, $O^l_0, O^l_1, O^l_2, \ldots, O^l_n, \ldots, O^l_{(N-1)}$, that are to be initiated concurrently, where $0 \leq n \leq (N-1)$, where N is the number of processors for performing operations and where the operation $O^l_n$ is performed by the $n^{th}$-processor in response to the $l^{th}$-initial instruction. When an instruction has zero operations, the instruction is termed a "NO OP" and performs no operations. When an instruction specifies only a single operation, it is a single-op instruction and when it specifies multiple operations, it is a multi-op instruction.

In accordance with the present invention, the initial instructions in the initial instruction stream, IS, are transformed to a transformed (or kernel) instruction stream, $\overline{IS}$, having Y transformed (kernel) instructions $\overline{I}_0, \overline{I}_1, \overline{I}_2, \overline{I}_3, \ldots, \overline{I}_k, \ldots, \overline{I}_{(Y-1)}$ where $0 \leq k \leq (Y-1)$.

Each kernel instruction, $\overline{I}_k$, in the kernel instruction stream $\overline{IS}$ is formed by a set of zero, one or more operations, $\overline{O}^{k,l}_0, \overline{O}^{k,l}_1, \overline{O}^{k,l}_2, \ldots, \overline{O}^{k,l}_n, \ldots, \overline{O}^{k,l}_{(N-1)}$, initiated concurrently where $0 \leq n \leq (N-1)$, where N is the number of processors for performing operations and where the kernel operation, $\overline{O}^{k,l}_n$, is performed by the $n^{th}$-processor in response to the $k^{th}$-kernel instructions.

The operations designated as $\overline{O}^{k,l}_0, \overline{O}^{k,l}_1, \overline{O}^{k,l}_2, \ldots, \overline{O}^{k,l}_n, \ldots, \overline{O}^{k,l}_{(N-1)}$ for the kernel $k^{th}$-instruction, $\overline{I}_k$, correspond to selected ones of the operations $O^l_0, O^l_1, \ldots, O^l_n, \ldots, O^l_{(N-1)}$ selected from all L of the initial instructions $I_l$ for which the index k satisfies the following:

$$k = l\,MOD[K]$$

where, $0 \leq l \leq (L-1)$.

Each kernel operation $\overline{O}^{k,l}_n$ is identical to a unique one of the initial operations $O^l_n$ where the value of l is given by $k = l\,MOD[K]$.

An initial instruction stream, IS, is frequently of the type having a loop, LP, in which the L instructions forming the loop are repeatedly executed a number of times, R, during the processing of the instruction stream. After transformation, an initial loop, LP, is converted to an kernel loop, KE, of K kernel instructions $\overline{I}_0, \overline{I}_1, \overline{I}_2, \ldots, \overline{I}_k, \ldots, \overline{I}_{(K-1)}$ in which execution proceeds from $\overline{I}_0$ toward $\overline{I}_{(K-1)}$ one or more times, once for each execution of the kernel, KE, where $0 \leq k \leq (K-1)$.

Overlapping of Loops

A modulo scheduling algorithm, for example as described in the articles referenced under the BACKGROUND OF INVENTION, is applied to a program loop that consists of one basic block. The operations of each iteration are divided into groups based on which stage, Sj, they are in where j equals $0, 1, 2, \ldots$, and so on. Thus, operations scheduled for the first iteration interval (II) of instruction cycles are in the first stage (S0), those scheduled for the next II cycles are in the second stage (S1), and so on. The modulo scheduling algorithm assigns the operations, $O^l_n$, to the various stages and schedules them in such a manner that all the stages, one each from consecutive iterations, can be executed simultaneously.

As an example, consider a schedule consisting of three stages S0, S1, and S2 per iteration. These three stages are executed in successive iterations (i=0, 1, 2, 3, 4,) in the following example:

| Iteration # | 0 | 1 | 2 | 3 | 4 |
|---|---|---|---|---|---|
| $II_0$ | S0(0) | | | | |
| $II_1$ | S1(0) | S0(1) | | | |
| $II_2$ | S2(0) | S1(1) | S0(2) | | |
| $II_3$ | | S2(1) | S1(2) | S0(3) | |
| $II_4$ | | | S2(2) | S1(3) | S0(4) |
| : | | | | : | : |
| : | | | | | |

Sj(i) represents all the operations in the j-th stage of iteration i. Starting with the interval in which the last stage of the first iteration is executed ($II_2$ in the above example) a repetitive execution pattern exists until the interval in which the first stage of the last iteration is executed ($II_4$ in the above example). All these repetitive steps may be executed by iterating with the computation of the form:

$$S2(i-2)\ S1(i-1)\ S0(i)$$

This repeated step is called the kernel. The steps preceding the kernel ($II_0$, $II_1$ in the example) are called the prolog, and the steps following the kernel (after $II_4$ in the example) are called the epilog. The nature of the overall computation is partioned as follows:

| Prolog: | S0(0) |
| | S1(0) S0(1) |
| Kernel: | S2(i-2) S1(i-1) S0(i) for i = 3, ..., n |
| Epilog: | S2(n-1) S1(n) |
| | S2(n) |

To avoid confusion between the iterations of the initial loop, LP, and the iterations of the kernel loop, KE, the terms l-iteration and k-iteration are employed, respectively.

Assuming that the computation specified by each l-iteration is identical with the computation specified by each other such iteration, the modulo scheduling algorithm guarantees (by construction) that corresponding stages in any two iterations will have the same set of operations and the same relative schedules. However, if the body of the loop contains conditional branches, successive iterations can perform different computations. These different computations are handled in the kernel-only code by means of a conditionally executed operation capability which produces the same result as the situation in which each l-iteration performs the same computation.

Each operation that generates a result must specify the destination address in the multiconnect unit in which the result is to be held. In general, due to the presence of recurrences and the overlapping of l-iterations, the result generated by the operation in one l-iteration may not have been used (and hence still must be saved) before the result of the corresponding operation in the next l-iteration is generated. Consequently, these two results cannot be placed in the same register which, in turn, means that corresponding operations in successive iterations will have different destination (and hence, source) fields. This problem, if not accounted for, prevents the overlapping of l-iterations.

One way to handle this problem is to copy the result of one l-iteration into some other register before the result for the next l-iteration is generated. The obvious disadvantage of such copying is that a large number of copy operations result and performance is degraded. Another way around the problem without loss of performance, but with expensive hardware cost, is to organize the registers as a shift register with random read-write capability. If the registers are shifted every time a new l-iteration is started, the necessary copy operations will be performed simultaneously for all results of previous l-iterations. The disadvantage is the cost.

In accordance with the present invention, the problem is avoided less expensively by using register files (called multiconnect elements) with the source and destination fields as relative displacements from a base multiconnect pointer (mcp) when computing the read and write addresses for the multiconnect elements. The base pointer is modified (decremented) each time an iteration of the kernel loop is started.

Since the source and destination register (multiconnect element) addresses are determined by adding the corresponding operation address offset (ao) to the current value of the multiconnect pointer (mcp), the specification of a source address must be based on a knowledge of the destination address of the operation that generated the relevant result and the number of times that the base multiconnect pointer has been decremented since the result generating operation was executed.

Kernel-Only Code

Code space can be saved relative to the non-overlapping version of code by using overlapping kernel-only schedules. The use of kernel-only code requires the following conditions:
1. that Sj(i) be identical to Sj(k) for all i and k and
2. the capability of conditionally executing operations.
The notation Sj(i) if p(i)

means that the operations in the j-th stage of the i-th l-iteration are executed normally if and only if the predicate (Boolean value) p(i) is true. If p(i) is false, every operation in Sj(i) will effectively be a NO OP, that is, no operation.

These conditions yield the following kernel-only loop:
   LOOP:(for i=1, ... , n+2)
   S2(i−2),0,1,2 if p(i−2)
   S1(i−1),0,1 if p(i−1)
   S0(i),0 if p(i)
   If i is less than n
   then decrement mcp pointer, set p(i+1) to true and goto LOOP
   else decrement base pointer, set p(i+1) to false and goto LOOP The initial conditions for the kernel-only code are that all the p(i) have been cleared to false and p(1) is set to true. After n+2 iterations, the loop is exited.

To provide consistency, the terms used in this specification are generally as set forth in the following term table.

Term Table

IS = initial instruction stream having Z initial instructions $I_0, I_1, I_2, I_3, \ldots, I_l, \ldots, I_{(Z-1)}$ where $0 \leq l \leq Z$.

$I_l = l^{th}$-initial instruction in the initial instruction stream IS formed by a set of zero, one or more operations, $O^l_0, O^l_1, O^l_2, \ldots, O^l_n, \ldots, O^l_{N-1}$, initiated concurrently, where $0 \leq n \leq (N-1)$, where N is the number of processors for performing operations and where the operation $O^l_n$ is performed by the $n^{th}$-processor in response to the $l^{th}$ initial instruction. When an instruction has zero operations, the instruction is termed a "NO OP" and performs no operations.

LP = an initial loop of L initial instructions $I_0, I_1, I_2, \ldots, I_l, \ldots, I_{(L-1)}$ which forms part of the initial instruction stream IS and in which execution proceeds from $I_O$ toward $I_{(L-1)}$, and which commences with $I_0$ one or more times, once for each iteration of the loop, LP, where $0 \leq l \leq (L-1)$.

L = number of instructions in the initial loop, LP.

$O^l_n = n^{th}$-operation of a set of zero, one or more operations $O^l_0, O^l_1, O^l_2, \ldots, O^l_n, \ldots, O^l_{(N-1)}$ for the $l^{th}$-initial instruction, $I_l$, where $0 \leq n \leq (N-1)$ and where N is the number of processors for performing operations and where the operation $O^l_n$ is performed by the $n^{th}$-processor in response to the $l^{th}$-instruction.

$\overline{IS}$ = kernel instruction stream having Y kernel instructions $\overline{I}_0, \overline{I}_1, \overline{I}_2, \overline{I}_3, \ldots, \overline{I}_k, \ldots, \overline{I}_{(Y-1)}$ where $0 \leq k \leq (Y-1)$.

$\overline{I}_k = k^{th}$-kernel instruction in the kernel instruction stream $\overline{IS}$ formed by a set of zero, one or more operations, $\overline{O}^{k,l}_0, \overline{O}^{k,l}_1, \overline{O}^{k,l}_2, \ldots, \overline{O}^{k,l}_n, \ldots, \overline{O}^{k,l}_{(N-1)}$, initiated concurrently where $0 \leq n \leq (N-1)$, where N is the number of processors for performing operations and where the kernel operation, $\overline{O}^{k,l}_n$, is performed by the $n^{th}$-processor in response to the $k^{th}$-kernel instruction. When an instruction has zero operations, the instruction is termed a "NO OP" and performs no operations.

KE = a kernel loop of K kernel instructions $\overline{I}_0, \overline{I}_1, \overline{I}_2, \ldots, \overline{I}_k, \ldots, \overline{I}_{(K-1)}$ in which execution proceeds from $\overline{I}_0$ toward $\overline{I}_{(K-1)}$ one or more times, once for each execution of the kernel, KE, where $0 \leq k \leq (K-1)$.

K = number of instructions in kernel loop, KE.

$\overline{O}^{k,l}_n = n^{th}$-operation of a set of zero, one or more operations $\overline{O}^{k,l}_0, \overline{O}^{k,l}_1, \overline{O}^{k,l}_2, \ldots, \overline{O}^{k,l}_n, \ldots, \overline{O}^{k,l}_{(N-1)}$ for the $k^{th}$-instruction, $\overline{I}_k$, where $0 \leq n \leq (N-1)$ and N is the number of processors for performing operations.

The operations designated as $\overline{O}^{k,l}_0, \overline{O}^{k,l}_1, \overline{O}^{k,l}_2, \ldots,$ $\overline{O}^{k,l}_n, \ldots, \overline{O}^{k,l}_{(N-1)}$ for the kernel $k^{th}$-instruction, $\overline{I}_k$, correspond to selected ones of the operations $O^l_0, O^l_1, \ldots, O^l_n, \ldots, O^l_{(N-1)}$ selected from all L of the initial instructions $I_l$ for which the index k satisfies the following:

$$k = lMOD[K]$$

where, $0 \leq l \leq (L-1)$

Each kernel operation $\overline{O}^{k,l}_n$ is identical to a unique one of the initial operations $O^l_n$ where the value of l is given by $k = lMOD[K]$.

$S_n^l$ = stage number of each $n^{th}$ operation, $O_n^{k,l}$, for $0 \leq n \leq (N-1)$ in the $l^{th}$-initial instruction, $I_l$.

= INT[l/K]

where, $0 \leq S_n^l \leq (J-1)$ $(J-1) = INT[L/K]$.

= $po_n^{k,l}$

J = the number of stages in the initial loop, LP.
i = iteration number for initial loop, LP.
ī = iteration number for kernel loop, KE.
II = iteration interval formed by a number, K, of instruction periods.
T = sequence number indicating cycles of the computer clock
icp(ī) = iteration control pointer value during $\bar{i}^{th}$-iteration.

mcp(i) = multiconnect pointer value during $i^{th}$-iteration

= $\begin{cases} \text{constant, for } i = 1 \\ D^*[mcp(i-1)], \text{ for i greater than 1.} \end{cases}$ $D^*[]$ = operator for forming a modified value of mcp(ī) or icp(ī) from the previous value mcp(ī−1) or icp(ī−1).

$ao^k_n(c)$ = address offset for $c^{th}$-connector port specified by $n^{th}$-operation of the kernel $k^{th}$-instruction, $\overline{I}_k$.

$a_n^k(c)(i)$ = multiconnect memory address for $c^{th}$-connector port determined for $n^{th}$-operation of $k^{th}$-instruction during $i^{th}$-iteration.

= $ao_n^k(c) + mcp(i)$.

$po_n^{k,l}$ = predicate offset specified by $n^{th}$-operation, $O_n^{k,l}$, of kernel $k^{th}$-instruction.

= INT[l/K], where $0 \leq po_n^{k,l} \leq (J-1)$.

The predicate offset, $po_n^{k,l}$, from the kernal operation $O_n^{k,l}$ is identical to the stage number $S_n^l$ from the initial operation, $O_n^l$, which corresponds to the kernal operation, $O_n^{k,l}$. The operation $O_n^l$ corresponds to $O_n^{k,l}$ when for both operations l equals l and n equals n but k may or may not equal k.

-continued $p_n^k(i)$ = iteration control register (icr) multiconnect memory address determined for $n^{th}$-operation of $k^{th}$-instruction during i-iteration.

= $po_n^{k,l} + icp(i)$.

$O^l_n[i]$ = execution of $O^l_n$, during $i^{th}$-iteration where $O^l_n$ is the $n^{th}$-operation within $l^{th}$-initial instruction.
$\overline{O}^{k,l}_n[\bar{i}]$ = execution of $\overline{O}^{k,l}_n$ during $\bar{i}^{th}$-iteration where $\overline{O}^{k,l}_n$ is the $n^{th}$-operation with $k^{th}$-kernel instruction.
$\bar{i} = i + S_n^l$.
$i = \bar{i} - po_n^{k,l}$.
$k = lMOD[K]$.

lc = loop count for counting each iteration of kernel loop, KE, corresponding to iterations of initial loop, LP.
= (R1)
esc = epilog stage count for counting additional iterations of kernel loop, KE, after iterations which correspond to initial loop, LP.
= $S_n^l$ for l=L (the largest stage number).

psc = prolog stage count for counting first $(S^l_n - 1)$ iterations of initial loop, LP.
$C^k_n(\bar{i})$ = iteration control value for $n^{th}$-operation during $\bar{i}^{th}$-iteration accessed from a control register at $p^k_n(\bar{i})$ address.
R = number of iterations of initial loop, LP, to be performed.
$\overline{R}$ = number of iterations of kernel loop, KE to be performed.
$\overline{R} = R + esc$ Numeric Processor—FIG. 2

Figure 2:
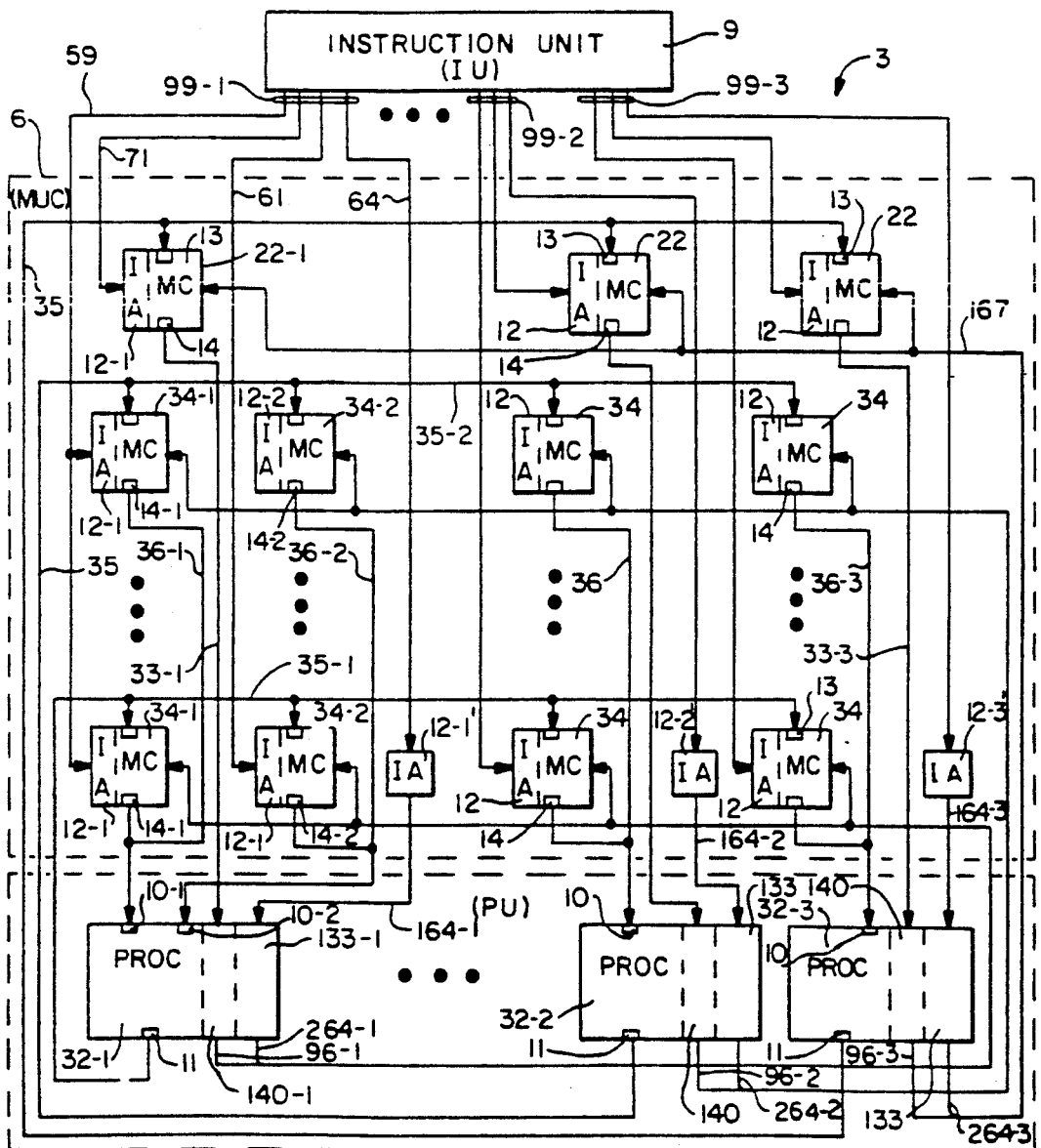
FIG. 2 is a block diagram of a numeric processor computer which forms part of the FIG. 1 system.

A block diagram of the numeric processor, computer 3, is shown in FIG. 2. The computer 3 employs a horizontal architecture for use in executing an instruction stream fetched by the instruction unit 9. The instruction stream includes a number of kernel instructions, $\overline{I}_0, \overline{I}_1, \overline{I}_2, \ldots, \overline{I}_k, \ldots, \overline{I}_{(K-1)}$ of an instruction stream, $\overline{IS}$, where each said instruction, $\overline{I}_k$, of the instruction stream $\overline{IS}$ specifies one or more operations $\overline{O}^{k,l}_1, \overline{O}^{k,l}_2, \ldots, \overline{O}^{k,l}_n, \ldots, \overline{O}^{k,l}_N$, where each operation, $\overline{O}^{k,l}_n$, provides address offsets, $ao^k_n(c)$, used in the invariant address (IA) units 12.

To process instructions, the instruction unit 9 sequentially accesses the kernel instructions, $\overline{I}_k$, and corresponding operations, $\overline{O}^{k,l}_n$, one or more times during one or more iterations, $\bar{i}$, of the instruction stream $\overline{IS}$.

The computer 3 includes one or more processors 32, each processor for performing one or more of operations, $\overline{O}^{k,l}_n$, specified by the instructions, $\overline{I}_k$, from the instruction unit 9. The processors 32 include input ports 10 and output ports 11.

The computer 3 includes a plurality of multiconnect elements (registers) 22 and 34, addressed by memory addresses $a^k_n(c)(\bar{i})$, from invariant addressing (IA) units 12. The multiconnect elements 22 and 34 connect operands from and to the processors 32. Each multiconnect element 22 and 34 has an input port 13 and an output port 14. Multiconnect elements operands for the processors 32 on their memory output ports 14 when addressed by invariant addresses from the invariant address IA units 12.

The computer 3 includes processor-multiconnect buses 35 for connecting output result operands from processor output ports 11 to multiconnect input ports 13.

The computer 3 includes multiconnect-processor buses 36 for connecting input operands from multiconnect output ports 14 to processor input ports 10.

The computer 3 includes an invariant addressing (IA) unit 12 for addressing the multiconnect elements 22 and 34 during different iterations including a current iteration, i, and a previous iteration, (i−1).

In FIG. 2, the output lines 99-1 from the instruction unit 9 are asociated with the processor 32-1. The S1 source address on bus 59 addresses through an invariant address unit 12 a first column of multiconnect elements 34-1 to provide a first operand input on bus 36-1 to processor 32-1 and the S2 source address on bus 61 addresses through an invariant address unit 12 a second column of multiconnects elements 34-2 to provide a second operand input to processor 32-1 on column bus 36-2. The D1 destination address on bus 64 connects through the invariant address unit 12-1 and latency delay 133-1 to address the row of multiconnect elements 34 which receive the result operand from processor 32-1. The instruction unit 9 provides a predicate address on bus 71 to a predicate multiconnect element 22-1 which in response provides a predicate operand on bus 33-1 to the predicate control 140-1 of processor 32-1.

In a similar manner, output lines 99-2 and 99-3 from the instruction unit 9 are associated with the processor 32-2 and 32-3, respectively, for addressing through invariant address units 12 the rows and columns of the multiconnect unit 6. The output lines 99-3 and processor 32-3 are associated with the multiconnect elements 22 which, in one embodiment, function as the predicate control store. Processor 32-3 is dedicated to controlling the storing of predicate control values to the multiconnect elements 22. These control values enable the computer of FIG. 2 to execute kernel-only code, to process recurrences on loops and to process conditional recurrences on loops.

Figure 3:
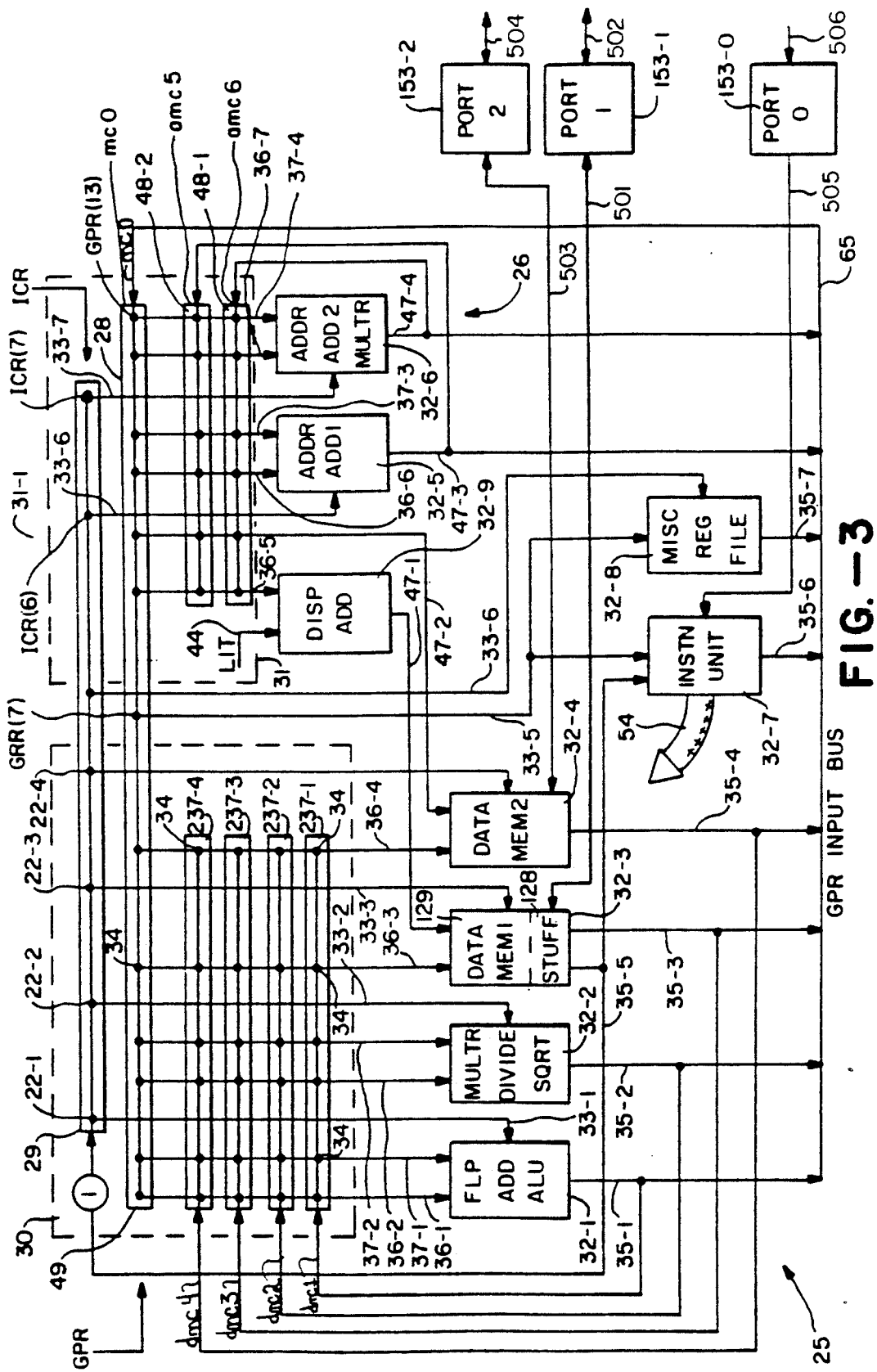
FIG. 3 is a block diagram of one preferred embodiment of a numeric processor computer of the FIG. 2 type.

NP Processing Unit—FIG. 3

In FIG. 3, further details of the computer 3 of FIG. 2 are shown. In FIG. 3, a number of processors 32-1 through 32-9 forming the processing unit 8 are shown. The processors 32-1 through 32-4 form a data cluster for processing data.

In the data cluster, the processor 32-1 performs floating point (FAdd) adds and arithmetic and logic unit (ALU) operations such as OR, AND, and compares including "greater than" (Fgt), "greater than or equal to" (Fge), and "less than" (Flt), on 32-bit input operands on input buses 36-1 and 37-1. The processor 32-1 forms a 32-bit result on the output bus 35-1. The bus 35-1 connects to the general purpose register (GPR) input bus 65 and connects to the row 237-1 (dmc 1) of multiconnect elements 34. The processor 32-1 also receives a predicate input line 33-1 from the predicate multiconnect ICR(1) in the ICR predicate multiconnect 29.

The processor 32-2 functions to perform floating point multiplies (FMpy), divides (FDiv) and square roots (FSqr). Processor 32-2 receives the 32-bit input data buses 36-2 and 37-2 and the iteration control register (ICR) line 33-2. Processor 32-2 provides 32-bit output on the bus 35-2 which connects to the GPR bus 65 and to the row 237-2 (dmc 2) of multiconnect elements 34.

The processor 32-3 includes a data memory 1 (Mem1) functional unit 129 which receives input data on 32-bit bus 36-3 for storage at a location specified by the address bus 47-1. Processor 32-3 also provides output data at a location specified by address bus 47-1 on the 32-bit output bus 35-3. The output bus 35-3 connects to the GPR bus 65 and the multiconnect elements row 237-3 (dmc 3) of multiconnect 34. The Mem 1 unit 129 connects to port (1) 153-1 through a line 501 for transfers to and from main store 7 through a line 502 and unit 129 has the same program (address space as distinguished from multiconnect addresses) as the main store 7. The processor 32-3 also includes a control (STUFF) functional unit 128 which provides an output on bus 35-5 which connects as an input to the predicate ICR multiconnect 29.

The processor 32-4 is the data memory 2 (Mem2). Processor 32-4 receives input data on 32-bit bus 36-4 for storage at an address specified by the address bus 47-2. Processor 32-4 also receives an ICR predicate input on a line from a multiconnect element 22-4. Processor 32-4 provides an output on the 32-bit data bus 35-4 which connects to the GPR bus 65 and as an input to row 237-4 (dmc 4), of the multiconnect elements 34. Processor 32-4 connects to port (2) 153-2 through a line 503 for transfers to and from main store 7 through a line 504 and unit 32-4 has the same program address space (as distinguished from multiconnect addresses) as the main store 7.

The processing element 32-1 is connected to a column of multiconnect elements 34 through the bus 36-1, one such multiconnect element being in each of the rows 237-1 through 237-4 (dmc 1,2,3 and 4, respectively) and one in the GPR row 28 (mc0). The processing element 32-1 is connected to a similar column of multiconnect elements 34 through the bus 37-1. In like fashion, the processing element 32-2 is connected to a column of multiconnect elements 34 through the bus 36-2, and to another such column through the bus 37-2. The processing element 32-3 is connected to a column of multiconnect elements 34 through the bus 36-3, and the processing element 32-4 is connected to a column of multiconnect elements 34 through the bus 36-4. Together, the rows 237-1 through 237-4 and a portion of the rows 28 and 29 having multiconnect elements which are connected to the processor elements 32-1 through 32-4 form the data cluster multiconnect array 30.

The ICR multiconnect elements 22, including ICR(1), ICR(2), ICR(3), ICR(4) and the GPR(1), GPR(2), GPR(3), GPR(4), GPR(5), and GPR(6) multiconnect elements 34 are within the data cluster multiconnect array 30.

In FIG. 3, the processing elements 32-5, 32-6, and 32-9 form the address cluster of processing elements. The processor 32-9 is a displacement adder which adds an address on address bus 36-5 to a literal address on bus 44 from the instruction unit 32-7 to form an output address on bus 47-1 (amc6).

The processor 32-5 include an Address Adder 1 (AAd1). The processor 32-5 receives an input address on bus 36-6 and a second input address on bus 37-3 and an ICR value from line 33-6. The processor 32-5 provides a result on output bus 47-3 which connects to the GPR bus 65 and to the row 48-2 (amc5) of multiconnect elements 34.

The processor 32-6 includes an Address Adder 2 (AAd2) functional unit and a multiplier (AMpy) functional unit which receive the input addresses, on buses 36-7 and 37-4 and the ICR input on line 33-7. Processing element 32-6 provides an output on bus 47-4 which connects to the GPR bus 65 and to the row 48-1 (amc6) of the multiconnect elements 34.

In FIG. 3, the Address Adder 1 of processor 32-5 performs three operations, namely, add (AAd1), subtract (ASub1), and NO OP. All operations are performed on thirty two bit two's complement integers. All operations are performed in one clock cycle. The operation specified is performed regardless of the state of the enable bit (WEN line 96-2, FIG. 13); the writing of the result is controlled by the enable bit.

The Address Adder 1 adds (AAd1) the two input operands and places the result on the designated output bus 47-3 to be written into the specified address multiconnect element of row 48-2 (amc5) or into the specified General Purpose multiconnect element of row 28 (mc0). Since the add operation is commutative, no special ordering of the operands is required for this operation.

The address subtract operation is the same as address add, except that one operand is subtracted from the other. The operation performed is operand B - operand A.

In FIG. 3, the Address Adder 2 (AAd2) of processor unit 32-6 is identical to Address Adder 1 (AAd1) of processor unit 32-5 except that Adder 2 receives a separate set of commands from the instruction unit 32-7 and places its result on row 48-1 (amc6) of the Address Multiconnect array 31 rather than on row 48-2 (amc5).

In FIG. 3, the address adder/multiplier 32-6 performs three operations, namely, add (AAd2), multiply (AMpy), and NO OP. All operations are performed on thirty two bit two's complement integers. All operations are performed regardless of the state of the enable bit; the writing of the result is controlled by the enable bit.

The Address Multiplier in processor 32-6 will multiply the two input operands and place the results on the designated output bus to be written into the specified row 48-1 (amc6) address multiconnect array 31 or into the specified General Purpose Register row 28 (mc0). The input operands are considered to be thirty-two bit two's complement integers, and an intermediate sixty-four bit two's complement result is produced. This intermediate result is truncated to 31 bits and the sign bit of the intermediate result is copied to the sign bit location of the thirty two bit result word.

Each of the processing elements 32-1 through 32-4 in FIG. 3 is capable of performing one of the operations $O^l_n$ where l designates the particular instruction in which the operation to be performed is found. The n designates the particular one of the operations. For example, the floating point add (FAdd) in processor 32-1 is operation n=1, the arithmetic and logic operation is operation n=2, and so on. Each operation in an instruction l commences with the same clock cycle. However, each of the processors for processing the operations may require a different number of clock cycles to complete the operation. The number of cycles required for an operation is referred to as the latency of the processor performing the operation.

In FIG. 3, the address multiconnect array 31 includes the rows 48-1 (amc6) and 48-2 (amc5) and a portion of the multiconnect elements in the GPR multiconnect 28 and the ICR multiconnect 29.

In FIG. 3, the processor 32-7 serves as an instruction unit having an output bus 54 which connects with different lines to each of the other processors 32 in FIG. 3 for controlling the processors in the execution of instructions. The processor 32-7 also provides an output on bus 35-6 to the GPR bus 65. Processor 32-7 connects to port (0) 153-0 through a line 505 for instruction transfers from main store 7 through a line 506.

In FIG. 3, the processor 32-8 is a miscellaneous register file which receives the input line 33-5 from the GPR(7) multiconnect element 34 and the line 33-6 from the ICR(5) element 22-5. The processor 32-8 provides an output on bus 35-7 which connects to the GPR bus 65.

Each of the multiconnect arrays 30 and 31 comprises a plurality of multiconnect memory elements 34; the elements 34 are arranged in rows and columns. Each multiconnect element 34 is effectively a 64-word register file, with 32 bits per word, and is capable of writing one word and reading one word per clock cycle. Each row receives the output of one of the processors 32 and each column provides one of the inputs to the processors 32. All of the multiconnect elements 34 in any one row store identical data. A row in the multiconnect arrays 30 and 31 is effectively a single multi-port memory element that, on each cycle, can support one write and as many reads as there are columns, with the ability for all the accesses to be to independent locations in the arrays 30 and 31.

As mentioned in the preceding paragraph, each element 34 comprises a register that can store 64 words— that is, the register has 64 locations each of which can receive one 32-bit word. Each element 34 includes a multiconnect pointer register ("mcp") such as the register 82 shown in FIG. 12 and discussed elsewhere in this specification. Any one of the 64 locations in an element 34 can be addressed by specifying a displacement from a pointer stored in the mcp. This displacement is derived from an offset field in an instruction word. A "branch to top of loop" operation controlled by a "Brtop" instruction can decrement the mcp by one.

Figure 10:
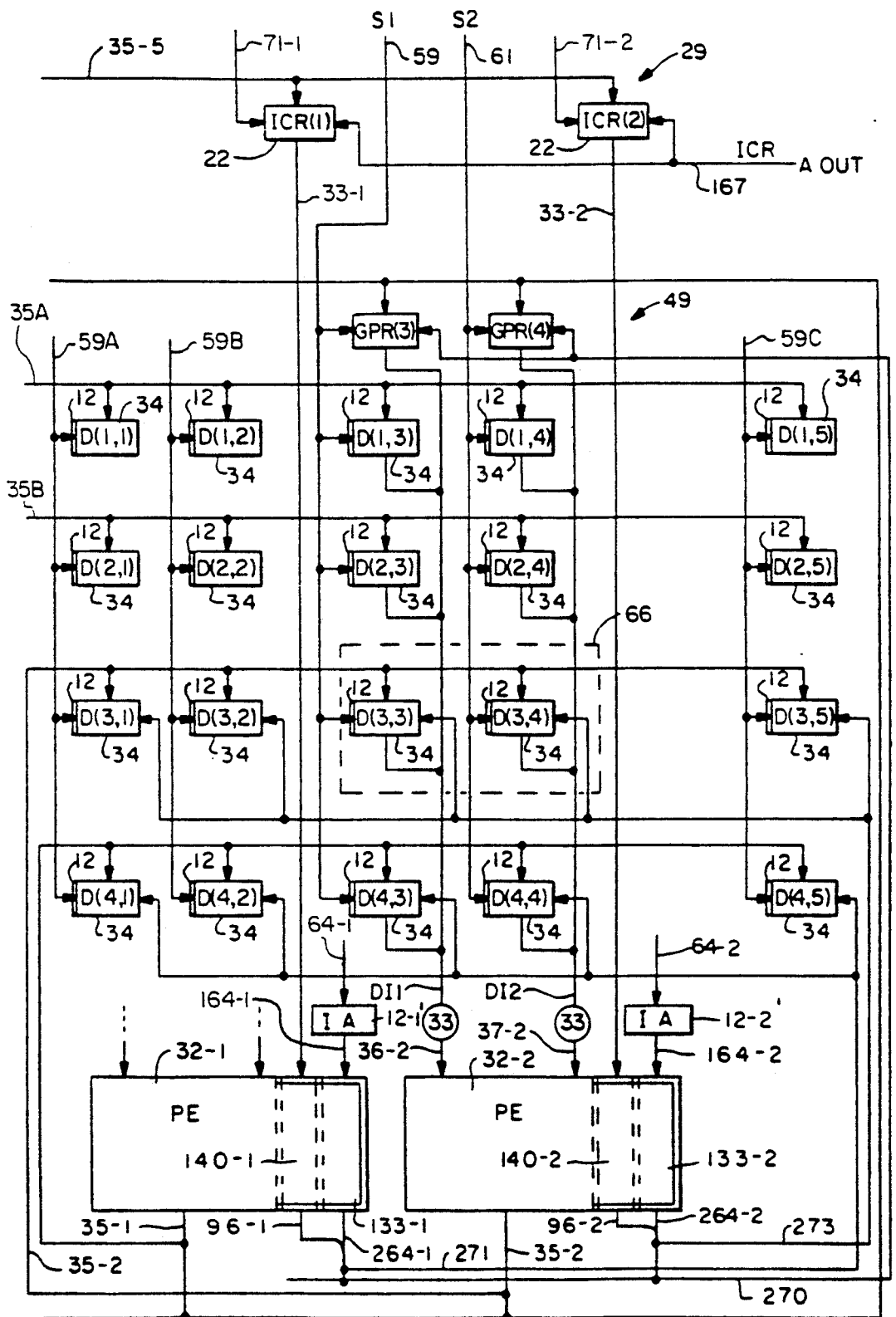
FIG. 10 is a block diagram of typical portion of the multiconnect and the corresponding processors which form part of the system of FIG. 3.
Figure 11:
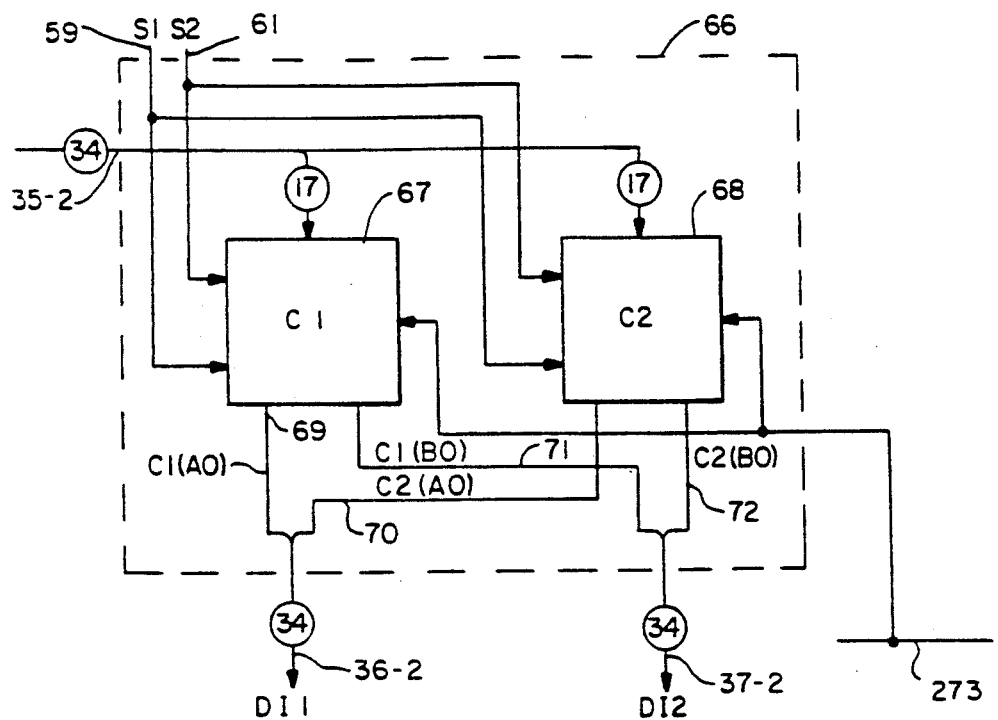
FIG. 11 depicts a block diagram of one preferred implementation of a physical multiconnect which forms one half of two logical multiconnects within the FIG. 3 system.

In a preferred embodiment, a multiconnect element 34 comprises two physical multiconnect gate arrays such as the gate arrays 67 and 68 shown in FIG. 11 and discussed elsewhere in this specification. The gate arrays 67 has 64 locations allocated to a first multiconnect element 34 such as an element D(3,3) shown in FIG. 10 and discussed elsewhere in this specification; each of these locations can receive 17 bits. One bit is a parity bit and the other 16 bits form one-half of a 32-bit word. Similarly, the array 68 has 64 17-bit locations which are allocated to the element D(3,3). A 32-bit word that is stored in the element D(3,3) is stored one-half in one of the locations in the gate array 67 and one-half in one of the locations in the gate array 68. Each of the arrays 67 and 68 also has 64 17-bit locations that are allocated to another multiconnect element 34 such as an element D(3,4) shown in FIG. 10. Two read and one write addresses are provided in each cycle.

Figure 12:
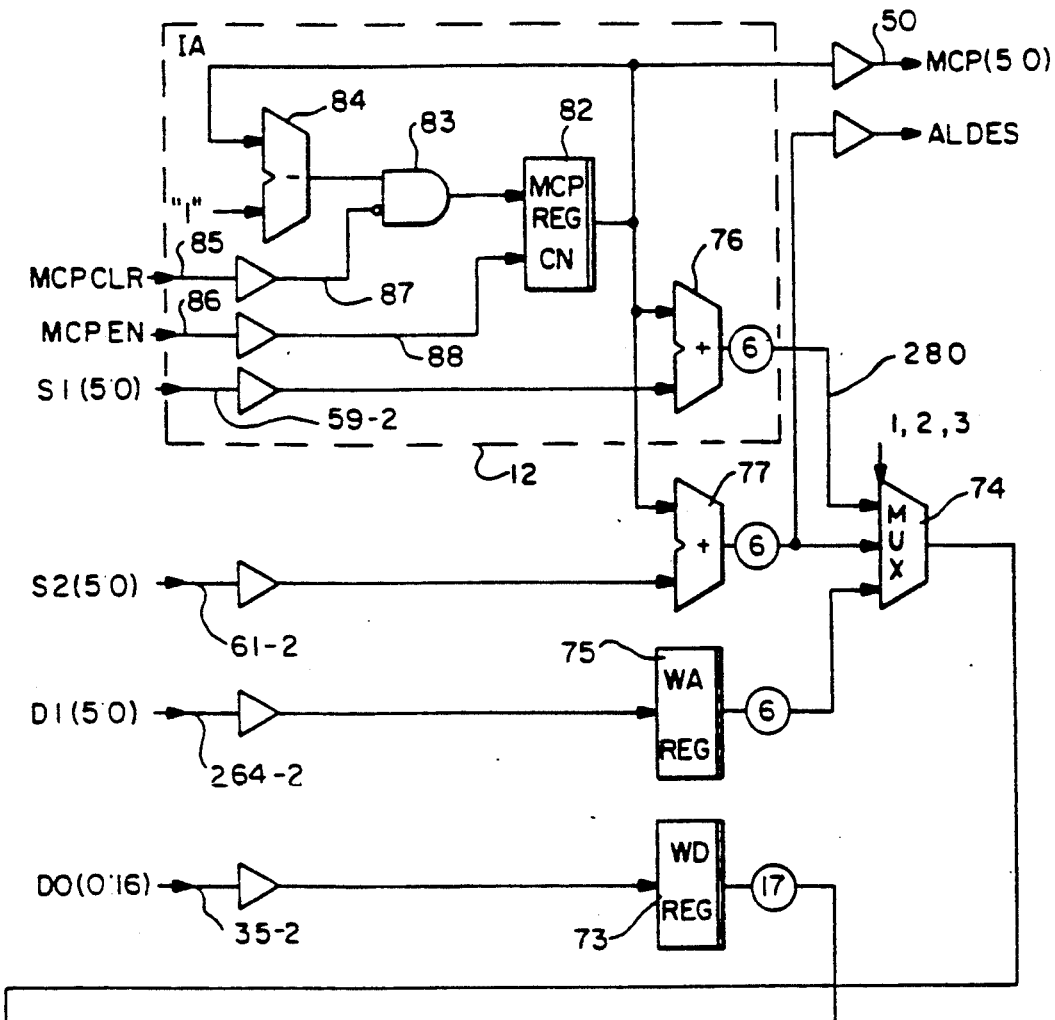
FIGS. 12 and 13 depict electrical block diagrams of portions of the physical multiconnect of FIG. 11.
Figure 12:
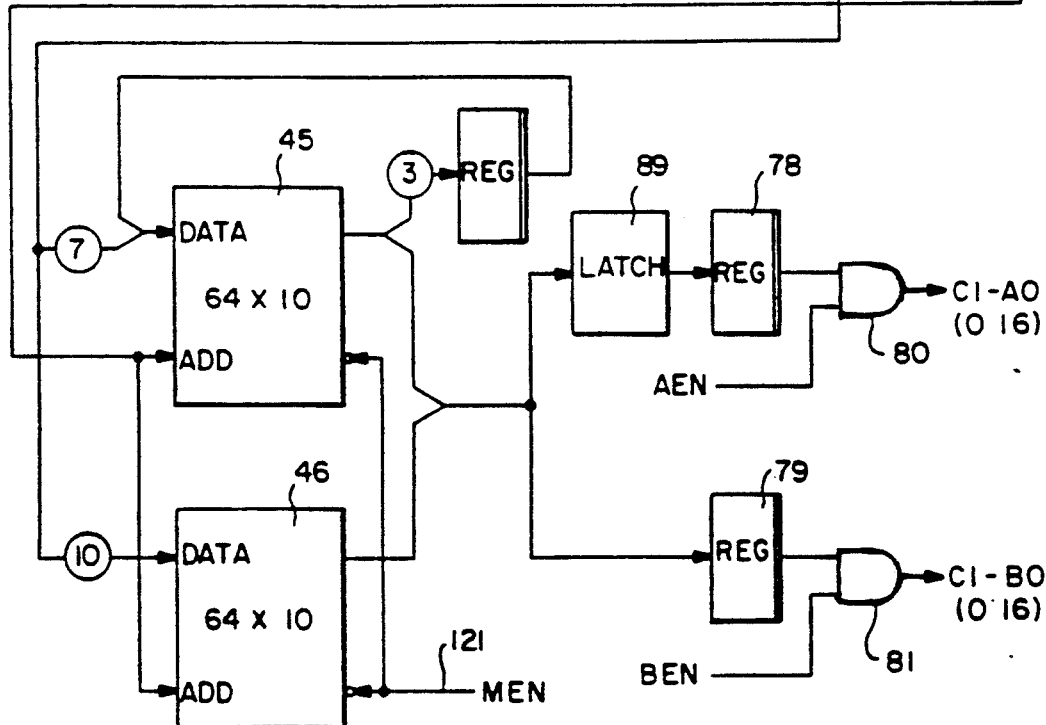

The write address in register 75 of FIG. 12 for each element 34 is the location that will be written into each element for that row. All the multiconnect elements 34 in that row will receive the same write address. The Write address is stored in each element 34 and is not altered before it is used to write the random access memory in the gatearray. The write data is also stored in a register such as a "write data" register 73 as shown in FIG. 12 and prior to any alteration is written into a pair of random access memories such as gatearray RAMs 45 and 46.

The Read addresses are added in array adders (76 and 77 of FIG. 12, to the present value of the mcp. Each multiconnect element 34 contains a copy of the mcp in a register 82 that can be either decremented or cleared. The outputs of the array adders are used as addresses to the gatearray RAM 45 and 46. The output of the RAM is then stored in registers 78 and 79.

Each multiconnect element 34 completes two reads and one write in one cycle. The write address and write data are registered at the beginning of the cycle and the write is done in the first part of the cycle and an address mux 74 first selects the write address from register 75.

After the write has been done, the address mux 74 is switched to the Aadd from adder 76. The address for the first or "A" read is added to the current value of the mcp to form Aadd(0:5).

The address selected by mux 74 from adder 77 for the second or "B" read is added to the current value of the mcp to form Badd(0:5). The A read data is then staged in a latch 89. Then the B read data and the latched A read data are both loaded into flip-flops of registers 78 and 79.

The address cluster 26 operates only on thirty-two bit two's complement integers. The address cluster arithmetic units 32-9, 32-5 and 32-6 treat the address space as a "circular" space. That is, all arithmetic results will wrap around in case of overflow or precision loss. No arithmetic exceptions are generated. The memory ports will generate an exception for addresses less than zero.

The address multiconnect array 31 of FIG. 3 is identical to the data multiconnect array 30 of FIG. 3 except for the number of rows and columns of multiconnect elements 34. The address multiconnect array 31 contains two rows 48-1 and 48-2 and six columns. Conceptually, each element consists of a sixty-four word register file that is capable of writing one word and reading one word per clock cycle. In any one row, the data contents of the elements 34 are identical.

All multiconnect addressing is done relative to the multiconnect pointer (mcp), except for references to the General Purpose Register file 28. The multiconnect pointer (mcp) is duplicated in each multiconnect element 34 in a mcp register 82 (see FIG. 12). This 6-bit number in register 82 is added in adders 76 and 77 to each register address modulo 64. In the example described, the mcp has the capability of being modified (decremented) and of being synchronized among all of the copies in all elements 34. The mcp register 82 (see FIGS. 6 and 12) is cleared in each element 34 for synchronization. However, for alternative embodiments, synchronization of the mcp registers is not required.

The General Purpose Register file is implemented using the multiconnect row 28 of elements 34 (mc0). The mcp for the GPR file is never changed. Thus, the GPR is always referenced with absolute addresses.

The value of the mcp at the time the instruction is issued by instruction unit 32-7 is used for both source and destination addressing. Since the destination value will not be available for some number of clock cycles after the instruction is issued, then the destination physical address must be computed at instruction issue time, not result write time. Since the source operands are fetched on the instruction issue clock cycle, the source physical addresses may be computed "on the fly". Since the mcp will be distributed among the multiconnect elements 34, then each multiconnect element provides the capability of precomputing the destination address, which will then be staged by the various functional units.

The destination address is added to mcp only if the GIB select bit is true. The GIB select bit is the most significant bit, DI(6) on line 64-1 of FIG. 4, of the seven bit destination address DI on bus 64. If the GIB select bit is false, then the destination address is not added to mcp, but passes unaltered.

Certain operations have one source address and two destination addresses. For these instances, the value of mcp is connected from the multiconnect element 34 via line 50 of FIG. 12 so that its value may be used in external computations. Bringing mcp off the chip also provides a basis for implementing logic to ensure that the multiple copies of mcp remain synchronized.

Figure 4:
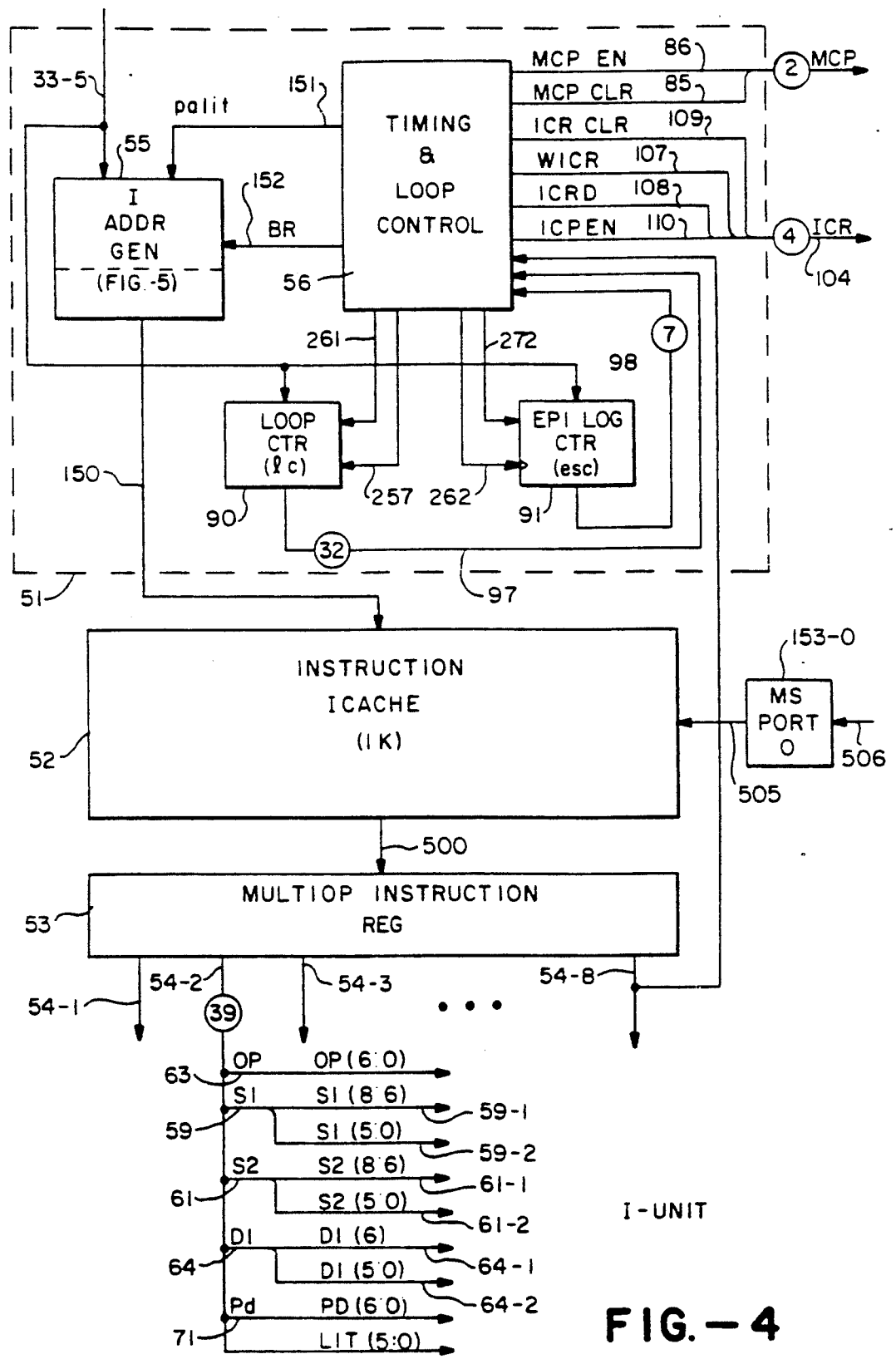
FIG. 4 is a block diagram of the instruction unit which forms part of the computer of FIG. 3.

Instruction Unit—FIG. 4

Further details of the instruction unit (IU) of FIG. 3 are shown. The instruction unit includes an instruction sequencer 51 which provides instruction addresses, by operation of an address generator 55, to an instruction memory (ICache) 52. Instruction memory 52 provides an instruction into an instruction register 53 through a communication line 500 under control of the sequencer 51. For a horizontal architecture, the instruction register 53 is typically 256 bits wide. Register 53 has outputs 54-1 through 54-8 which connect to each of the processing elements 32-1 through 32-8 in FIG. 3.

Each of the outputs 54 has similar fields and includes an opcode (OP) field, a first address source field (S1), a second address source field (S2), a destination field (D1), a predicate field (PD), and a literal field (LIT). By way of example, the output 54-2 is a 39-bit field which connects to the processor 32-2 in FIG. 3. The field sizes for the output 54-2 are shown in FIG. 4.

While the field definition for each of the other outputs 54 from the instruction register 53 are not shown, their content and operation are essentially the same as for output 54-2. The instruction unit bus 54-8 additionally includes a literal field (LIT) which connects as an input to bus 44 to the displacement adder 32-9 of FIG. 3.

The instruction unit 32-7 of FIGS. 3 and 4 provides the control for the computer 3 of FIG. 3 and is responsible for the fetching, caching, dispatching, and reformatting of instructions.

The instruction unit includes standard components for processing instructions for controlling the operation of computer 3 as a pipelined parallel processing unit. The following describes the pipeline structure and the operation of the address generator 55.

The pipeline in address generator 55 includes the following stages:

|C|I|E1...En|D|

C: During the C Cycle the ICache 52 of FIG. 4 is accessed. At the end of this cycle, the instruction register 53 is loaded.

I: During the I Cycle, the Instruction Register 53 is valid. The Opcodes, Source (S1, S2), Destination (D1) and other fields on buses 54 are sent to the various processors 32. The Source fields (S1, S2) access the multiconnects 34 during this cycle.

E: The E cycle or cycles represent the time that processors 32 are executing. This E cycle period may be from 1 to n cycles depending on the operation. The latency of a particular operation for a particular processor 32 is (n+1), where n is the number of E cycles for that processor.

D: During the D cycle, the results of an operation are known and are written into a target destination. An instruction that is in an I cycle may access the results that a previous instruction provided in its D cycle.

In multiple-operation (MultiOp) mode, which occurs when register 53 of FIG. 4 is employed, there are up to seven operations executing in parallel. This parallel operation is shown as:

```
| C | I | E1 | E2 | E3 | D  |
        | E1 | E2 | E3 | E4 | E5 | E6 | D |
        | E1 | E2 | E3 | E4 | E5 | D  |
        | E1 | E2 | E3 | D  |
        | E1 | E2 | E3 | E4 | D |
        | E1 | E2 | E3 | D  |
        | E1 | E2 | E3 | E4 | D |
```

The following is an example of the operation of a sequence of instructions starting at address A. The CurrIA address is used to access the ICache 52 of FIG. 4.

```
              | 0 | 1 | 2 | 3 | 4 | 5 | 6 | 7 | 8 |
A: I0    | T | C | I | E1| D |                       Latency = 2
A+1: I1      | T | C | I | E1| E2| D |               Latency = 3
A+2: I2          | T | C | I | E1| E2| E3| D |       Latency = 4
A+3: I3              | T | C | I | E1| E2| D |       Latency = 3

CurrIA   | A | A+1 | A+2 | A+3 |   |   |   |
         |   |     |     |     |   |   |   |
IR53     |   |     | I0  | I1  | I2| I3|   |   |
```

The following is an example of the operation of a Branch Instruction. Whether the branch instruction is conditional or unconditional does not matter. During the first half of Cycle 4, the Branch address is calculated. During that cycle the Tag and the TLB Arrays are accessed by the sequential address (A+3) in the first half, and by the Branch Address (T) in the second half. Also during Cycle 4, a Branch Predicate is accessed.

In Cycle 5 both the location in the ICache of the Sequential Instruction and the Target Instruction are known. Also known is the branch condition. The branch condition is used to select between the Sequential Instruction address and the Target Instruction address when accessing the ICache 52. If the Branch is an unconditional Branch, then the Target Instruction will always be selected.

```
           | 1 | 2 | 3 | 4   | 5   | 6   | 7 | 8 | 9 |
A: I0      | T | C | I |     |     |     |   |   |   |
A+1: BrT   |   | T | C | I   |     |     |   |   |   |
A+2: I2    |   |   | T | C   | I   |     |   |   |   |
A+3: I3    |   |   |   | T   |     |     |   |   |   |
T: J5      |   |   |   | T   | C   | I   |   |   |   |
T+1: J6    |   |   |   |     | T   | C   | I |   |   |

NextIA     | A | A+1| A+2| A+3 | A+4 | T+2 |   |   |   |
CurrIA     |   | A  | A+1| A+2 | A+3 | T+1 |   |   |   |
NextTIA    |   |    |    |     | T+1 |     |   |   |   |
CurrTIA    |   |    |    |     | T   |     |   |   |   |
IR         |   |    | I0 | BrT | I2  | J5  | J6|   |   |
```

The Timing and Loop Control 56 of FIG. 4 is control logic which controls the Iteration Control Register (ICR) multiconnect 29 in FIG. 3 (designated as 92 in FIG. 14), in response to a Loop Counter 90, Multiconnect/ICR Pointer Registers (mcp 82 in FIG. 12 and icp 102 in FIG. 14), and an Epilog Stage Counter 91. Control 56 is used to control the conditional execution of the processors 32 of FIG. 3.

The control 56 includes logic to decode the "Brtop" opcode and enable the Brtop executions. The control 56 operates in response to a "Brtop" instruction to cause instruction fetching to be conditionally transferred to the branch target address by asserting the BR signal on line 152. The target address is formed by address generator 55 using the sign extended value in the "palit" field which has a value returned to the sequencer 51 on bus 54-8 from the instruction register 53 and connected as an input on line 151 to address generator 55 in FIG. 4 and FIG. 5.

Figure 14:
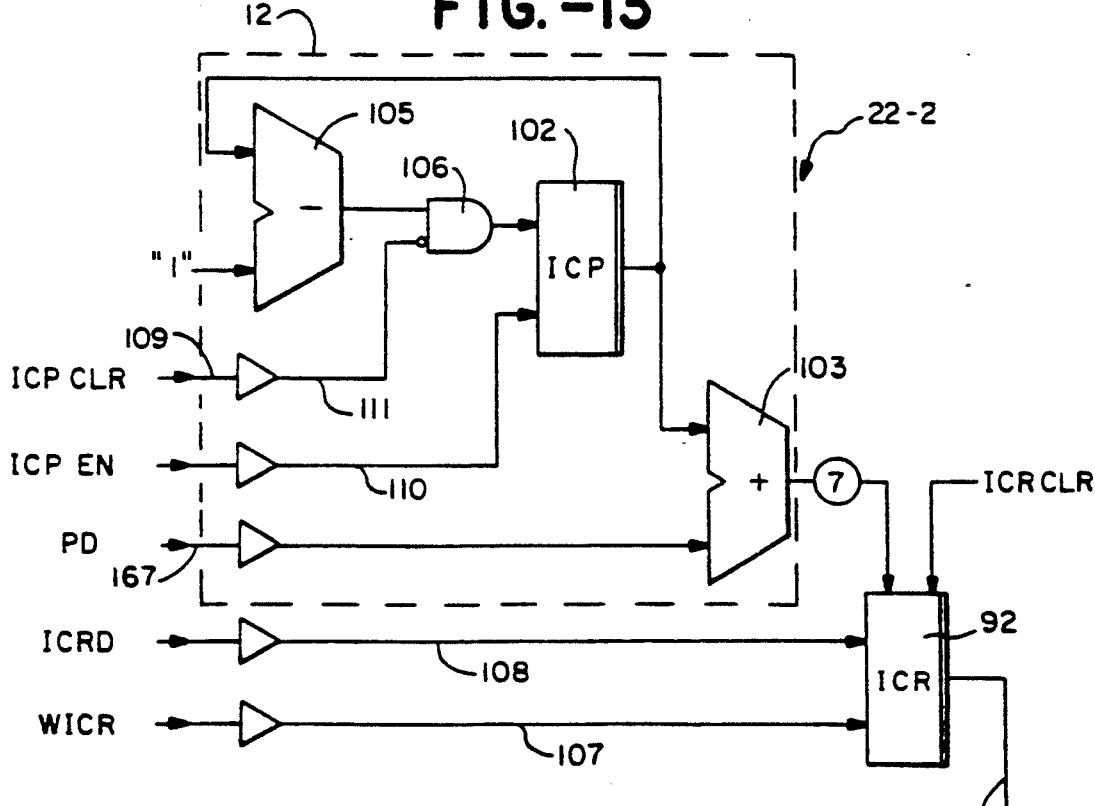
FIG. 14 depicts a block diagram of a typical predicate ICR multiconnect within the FIG. 3 system.

The Loop Counter (lc) 90, Epilog Stage Counter (esc) 91, and the ICR/Multiconnect Pointers (icp/mcp) register 82 of FIG. 6, FIG. 12 and 102 of FIG. 14 are conditionally decremented by assertion of MCPEN and ICPEN from control 56 in response to the Brtop instruction. The "icr" location addressed by (icp−1−)mod128 is conditionally loaded in response to the Brtop instruction into register 92 of FIG. 14 with a new value in response to the signals on lines 104 from control 56.

The branch latency and the latency of the new values in the "lc", "esc", "icr", and "icp/mcp" are 3 cycles after "Brtop" is issued. Two additional instructions execute before the "Brtop" operation takes effect.

The "lc" value in register 90 and "esc" in register 91 of FIG. 4 are checked by control 56 on the cycle before the "Brtop" is to take effect (latency of 2 cycles) to determine what conditional operations should occur.

The control 56 operates in the following manner in response to "Brtop" by examining "lc" on 32-bit bus 97 and "esc" on 7-bit bus 98. If the "lc" is negative, the "esc" is negative, or if the "lc" and "esc" are both zero, then the branch is not taken (BR not asserted on line 151); otherwise, the branch is taken (BR asserted on line 151).

If the "lc" is greater then zero, then the "lc" is decremented by a signal on line 257; otherwise, it is unchanged.

If the "lc" is zero, and the "esc" is greater than or equal to zero, then the "esc" is decremented by a signal on line 262; otherwise, it is unchanged.

If the "lc" is positive, and the "esc" is greater than or equal to zero, then the "icp/mcp" is decremented by generating MCPEN and ICPEN on lines 85 and 86.

The Iteration Control Register(icr) 92 of FIG. 14 is used to control the conditional execution of operations in the computer 3. Each "icr" element 22 in FIG. 2 and 92 in FIG. 14 consists of a 128 element array with 1 bit in each element. On each cycle, each "icr" element 22 can be read by a corresponding one of the seven different processors (FMpy) 32-2, (FAdd) 32-1, (Mem1) 32-3, (Mem2) 32-4, (AAd1) 32-5, (AAd2) 32-6, and (Misc) 32-8. Each addressed location in the "icr" 92 is written implicitly at an "icr" address in response to the "Brtop" instruction.

An "icr" address is calculated by the addition of the "icrpred" field (the PD field on the 7-bit bus 71 of FIG. 4, for example) specified in an NP operation with the "ICR Pointer" (icp) register 102 at the time that the operation is initiated. The addition occurs in adder 103 of FIG. 14.

The Loop Counter "lc" 90 in FIG. 4 is a 32-bit counter that is conditionally decremented by a signal on line 257 during the execution of the "Brtop" instruction. The loop counter 90 is used to control the exit from a loop, and determine the updating of the "icr" register 92.

The Epilog Stage Counter "esc" 91 is a 7-bit counter that is conditionally decremented by a signal on line 262 during the execution of the "Brtop" instruction. The Epilog Stage Counter 91 is used to control the counting of epilog stages and to exit from a loop.

The detailed logical statement of the logic for control 56 for controlling the "lc" counter, the "esc" counter in response to "Brtop" appears in the following CHART.

---
CHART
---

```
if  ![(lc@2<0) :: (esc@2<0) :: (lc@2==0) && (esc@2==0)]
       pc@3 = brb@0 + paLit;
if  (lc@2>0) lc@3 = lc@2 - 1;
if  [(lc@2==0) && (esc@2>=0)] esc@3 = esc@2 - 1;
if  [(lc@2>=0) && (esc@2>=0)]
       {icr[icp@2 - 1]@3 = [(lc@2>0)? 1 : 0];
        icp@3 = icp@2 - 1; mcp@3 = mcp@2 - 1;}
```

! means NOT
:: means OR
&& means AND
== means COMPARE FOR EQUAL TO
>= means COMPARE FOR GREATER OR EQUAL TO
= means SET EQUAL TO
@ means OFFSET TIME
> means GREATER THAN

Instruction Address Generator—FIG. 5

In FIG. 5, further details of the instruction address generator 55 of FIG. 4 are shown. The generator 55 receives an input from the general purpose register file, GPR (7) via the input bus 33-5. The bus 33-5 provides data which is latched into a branch base register (BRB) 205. Register 205 is loaded as part of an initialization so as to provide a branch base address. The BRB register 205 provides an input to a first register stage 144-1 which in turn connects directly to a second register stage 144-2. The output from the register 144-2 connects as one input to an adder 146.

In FIG. 5, the address generator 55 receives the literal input (palit) on bus 151 which is derived through the timing loop control 56 of FIG. 4 directly from the instruction register 53 via the bus 54-8. In FIG. 5, the bus 151 has the literal field latched into a first register stage 145-1, which in turn is connected to the input of a second register stage 145-2. The output from the second register stage 145-2 connects as the second input to adder 146. The adder 146 functions to add a value from the general purpose register file, GPR (7), with a literal field from the current instruction to form an address on bus 154. That address on bus 154 is one input to a multiplexer 148. The multiplexer 148 receives its other input on bus 155 from an address incrementer 147. Incrementer 147 increments the last address from a instruction address register 149. The multiplexer selects either the branch address as it appears on bus 154 from the branch adder 146 or the incremented address on the bus 155 for storing into the instruction address register 149. The branch control line 152 is connected as an input to the multiplexer 148 and, when line 152 is asserted, the branch address on bus 154 is selected, and when not asserted, the incremented address on bus 155 is selected.

The instruction address from register 149 connects on bus 150 as an input to the instruction cache 52 of FIG. 4.

The registers 144-1, 144-2, 145-1, and 145-2, and the instruction register 149, provide a three-cycle latency for the instruction address generator 55. In the embodiment described, the earliest that a new branch address can be selected for output on the bus 150 is three cycles delayed after the current instruction in the instruction register 53 of FIG. 4. Of course, the latency is arbitrary and may be selected at many different values in accordance with the design of the particular pipeline data processing system.

Invariant Addressing Unit—FIG. 6

An invariant addressing unit, typical of the various invariant addressing units 12 of FIG. 2, is shown in FIG. 6. Each such unit includes a modifying unit such as a subtracter 84 for forming a current pointer address, mcp(i), from a previous pointer address mcp(i−1) with the operation $D*[mcp(i-1)]$ such that $mcp(i)=D*[mcp(i-1)]$. The unit 12 includes a pointer register 82 for storing the pointer address, mcp(i), for use in the $i^{th}$-iteration. The unit 12 includes an address generator (adder 76) combining the pointer address, mcp(i), with an address offset, $ao^k_n(c)$, to form the memory addresses, $a^k_n(c)(i)$, for the $i^{th}$-iteration, which address is connected to memories 34 to provide an output on the $c^{th}$ port. For the invariant address units 12-1 in FIG. 2, the $c^{th}$ port (c=1) is ports 14-1 and 10-1. For the Address units 12-2 the $c^{th}$ port (c=2) is ports 14-2 and 10-2. Processor 32-1 has first and second input ports (c=1, c=2) and the other processors have one or more similar inputs (c=3, c=4, . . . ).

Typical Processor—FIG. 7

In FIG. 7, further details of a typical one of the processors 32 of the FIG. 2 system are shown. The processor 32 includes one or more functional units 130. In FIG. 7, the functional units include the functional units 130-1 and 130-2. The functional units include well-known execution devices, such as adders, multipliers, dividers, square root units, arithmetic and logic units, and so forth. Additionally, in accordance with the present invention, the functional units also include data memories for storing data. When the functional units 130-1 and 130-2 of FIG. 7 perform arithmetic and logical functions, the functional units typically include first and second inputs, namely input bus 36 and input bus 37. The buses 36 and 37 are the data buses which carry data output from the multiconnect array of FIG. 2. Each functional unit 130 includes a number of shift-register stages (first-in/first-out stack), x, which represents the latency time of the functional unit, that is, the number of cycles required for the input data on buses 36 and 37 to provide valid outputs on buses 35, including the bus 35-1 from the unit 130-1 and the bus 35-2 from the unit 130-2. The number of stages 132-1, 132-2, . . . , 132-x determining the latency time is a variable and the different processors 32 of FIG. 2 may each have different number of stages and latency times. Similarly, each functional unit 130-1 and 130-2 within a processor may have different latency times. For example, the functional unit 130-1 has a latency of x and the functional unit 130-2 has a latency of y. The functional unit 130-2 has the stages 132-1, 132-2, . . . , 132-y which operate as a first-in/first-out stack.

In FIG. 7, an opcode decoder 137 receives an opcode on bus 63 from the instruction register 53 of FIG. 4. Decoder 137 provides a first output on line 156 for enabling the functional unit 130-1 and provides a second output on line 157 for enabling the second functional unit 130-2. Similarly, the enable signals from decoder 137 are input on lines 156 and 157 to the processor control 131.

In FIG. 7, a predicate stack 140 receives the predicate line 33 from one of the ICR registers 22 of FIG. 3. The predicate stack 140 includes a number of stages 140-1, 140-2, ..., 140-$x,y$ which is equal to the largest of x or y. When functional unit 130-1 is employed, the predicate stack utilizes x stages and, when functional unit 130-2 is enabled, the predicate stack 140 employs y stages so that the latency of the predicate stack matches that of the active functional unit.

Each of the stages in the stack 140 provides an input to the control 131. In this manner, the control 131 is able to control the operation and the output as a function of the predicate bit value in any selected stage of the stack 140.

In FIG. 7, the processor 32 includes an address first-in/first-out stack 133. The address stack receives a $D1_{in}$ bus 164 from the instruction register 53 of FIG. 4. The instruction stack 133 includes the largest of x or y stages, namely 133-1, 133-2, ..., 133-$x,y$. Whenever the functional unit 130-1 is enabled, x stages of the stack 133 are employed and the stack 133 provides an output 264 which has latency x under control of line 265 from control 131, and whenever the functional unit 130-2 is enabled, y stages of the stack 133 are employed and the output 264 has latency y under control of line 265. The processing unit 32 of FIG. 7 operates such that the latency of the particular unit enabled and the latency of the predicate stack 140 and the address stack 133 are all the same. In this manner, the pipeline operation of the processing units are maintained synchronized. In the simplest example, the processor 32 only need include a single functional unit having a single latency x for the functional unit 130-1, the predicate stack 140 and the address stack 133. The inclusion of more than one functional unit into a single processor is done for cost reduction.

In FIG. 7, the control unit 131 receives inputs from the decoder 137, the predicate stack 140 and the functional units 130-1 and 130-2. The control unit 131 provides a write enable (WEN) signal on line 96. The write enable signal on line 96 can be asserted or not asserted as a function of the state of a predicate bit and as a function of some condition created in a functional unit 130-1 or 130-2. The write enable signal on line 96 connects to the multiconnect 30 of FIG. 2 and determines when the result on bus 35-1 or 35-2 is actually to be written into the respective row of multiconnect elements.

Figure 8:
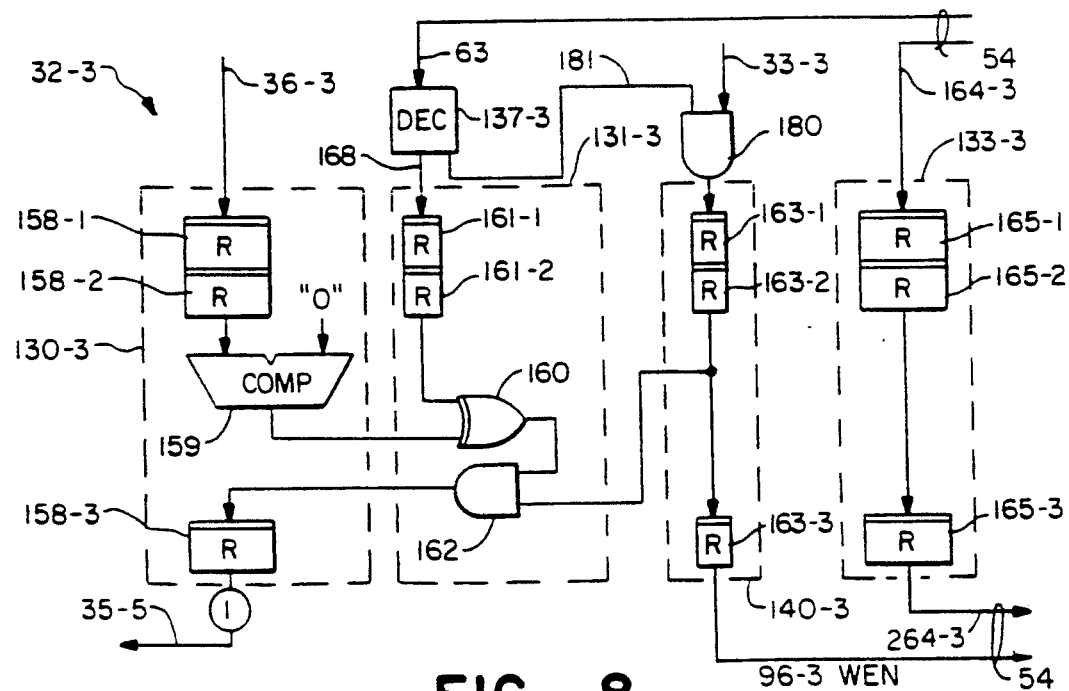
FIG. 8 depicts the STUFFICR control processor for controlling predicate values within the FIG. 3 system.

STUFFICR Processor—FIG. 8

In FIG. 8, further details of the STUFF processor 32-3, one of the processors 32 of FIG. 2, are shown. In FIG. 8, the processor 32-3 includes a functional unit 130-3, which has a latency of three cycles. The three cycles are represented by a plurality of register stages 158-1, 158-2, and 158-3. The input to register stage 158-1 is from the column data bus 36-3. A comparator 159 receives the output from stage 158-2 and compares it with a "0" input. If the input operand on bus 36-3 is all 0's, then the output from comparator 159 is asserted as a logical 1 connected to an EXCLUSIVE-OR gate 160 in a control 131-3. The other input to gate 160 is derived from an opcode decoder 137-3. The opcode decoder 137-3 functions to decode the opcode to detect the presence of either a STUFFICR or a STUFFBAR (STUFFICR) opcode. Whenever a STUFFICR opcode is decoded by decoder 137-3, a signal on a line 168 is asserted and latched into a register stage 161-1 in the control 131-3 and on the next clock cycle is latched into a register stage 161-2 to provide an input to the gate 160. During the same clock cycles the predicate bit from line 33-3 is latched in a register stage 163-1 in a predicate stack 140-3 if AND gate 180 is enabled by a decode signal (indicating either STUFFICR or STUFFBAR) from decoder 137-3 on a line 181. In the next cycle the data in the stage 163-1 is latched into a register stage 163-2 to provide an input to an AND gate 162. The output from the EXCLUSIVE-OR gate 160 forms the other input to AND gate 162. The output from gate 162 is latched into the register 158-3 to provide the ICR data on line 35-5 written into the addressed location of all predicate elements 22 in predicate multiconnect 29.

In FIG. 8, the predicate address on a bus 164-3 derives from the predicate field (PD) as part of bus 54-8 from the instruction register 53 of FIG. 4, through the invariant address unit 12-3 in FIG. 2 and is input to an address stack 133-3. The predicate address is advanced through the register stages 165-1, 165-2 and 165-3 to appear on a predicate address output 264-3. The predicate address on bus 264-3 together with the WEN signal on line 96-3 addresses the row of ICR multiconnect elements 22 to enable the predicate bit on line 35-5 to be stored into the addressed location in each element 22.

In FIG. 8, the latency of the functional unit 130-3, the control 131-3, the predicate stack 140-3, and the address stack 133-3 are all the same and equal three cycles.

Figure 9:
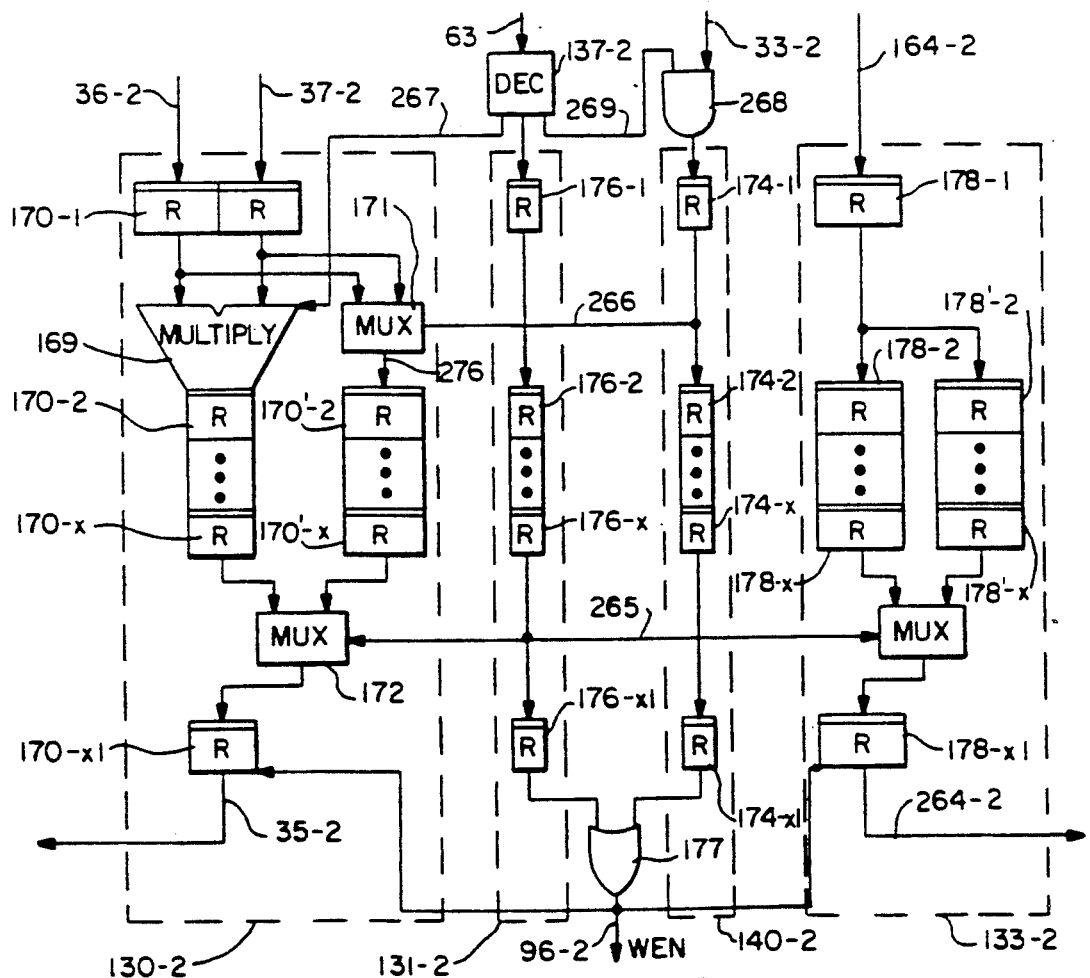
FIG. 9 depicts a multiply processor within the FIG. 3 system.

Iselect-Multiply Processor—FIG. 9

In FIG. 9, further details of the processor 32-2 of FIG. 3 are shown. A functional unit 130-2 includes a conventional multiplier 169 which is used to do multiplies, divides and square roots as specified by lines 267 from a decoder 137-2. Additionally, either the data input on bus 36-2 or the data input on bus 37-2 can be selected for output on the bus 35-2. The selection is under control of a predicate bit from a predicate stack 140-2 on a line 266 to multiplexer 171.

In FIG. 9, the bus 36-2 connects through a left register stage 170-1 as one input to the multiplier 169. The multiplier 169 includes register stages 170-2, ..., 170x. The bus 37-2 connects through a right register stage 170-1 as the other input to the multiplier 169. Additionally, the outputs from the register stages 170-1 connect as inputs to the multiplexer 171. The multiplexer 171 selects either the left or right register from the stage 170-1 to provide data onto the bus 276 as one input to a multiplexer 172 through a register stack 170. The multiplexer 171 is controlled to select either the left or right input, that is the latched value of the data from bus 36-2 or from bus 37-2, under control of a predicate bit latched in a register stage 174-1 in the predicate stack 140-2. The predicate latched into stage 174-1 is a 1 or 0 received through an AND gate 268 from the predicate line 33-2 which connects from the ICR multiconnect element 22-2 of FIG. 3. The AND gate 268 is enabled by a signal on line 269 asserted by decoder 137-2 when an Isel operation is to occur and multiplier 169 is to be bypassed. Also, gate 268 is satisfied when a multiply or other function is to occur with multiplier 169 and the value of the predicate bit on line 33-2 will be used, after propagation to a register stage 174-x1 to control the enable or disable of the storage of the results of that operation.

In FIG. 9, the multiplier 169 combines the input operands from the register stages 170-1 and processes them through the register stages 170-2 through 170-x. The number of stages x ranges from 1 to 30 or more and represents the number of cycles required to do complicated multiplications, divisions or square root operations. A like number of register stages 170'-2 or 170'-x connect from multiplexer 171 to multiplexer 172. An output selected from outputs provided by the 170-x and 170'-x stages connects through the multiplexer 172 to a final register stage 170-x1. The multiplexer 172 operates to bypass the multiplier functional unit 169 whenever an iselect, Isel, opcode is detected by decoder 137-2. The decoder 137-2 decodes the opcode and asserts a signal which is latched into a register stage 176-1 and transfered through stages 176-2 to 176-x. The registers 176-1 through 176-x are included in a control 131-2. When this signal is latched into the register stage 176-x, the signal is carried on line 265 and causes the multiplexer 172 to select the output from the register 170'-x as the input to the register 170-x1. Otherwise, when a multiply or other command using the multiplier 169 is decoded, multiplexer 172 selects the output from stage 170-x for latching into the stage 170-x1. Whenever an Isel command is asserted, the register 176-x1 stores a 1 at the same time that the selected operand is output on the bus 35-2. The 1 in register 176-x1 satisfies an OR gate 177, which in turn enables a write enable signal, WEN, on a line 96-2. The WEN signal on line 96-2, together with a destination address on a bus 264-2, are propagated to multiconnect 237-2 (dmc2) to store the data on bus 35-2 in each element 34 of the row.

When the decoder 137-2 does not detect an iselect command, then the OR gate 177 is satisfied or not as a function of a 1 or 0 output from a predicate stack register stage 174-x1 in the predicate stack 140-2. The stack 140-2 includes, besides the register stages 174-1 and 174-x1, one or more register stages 174-2 through 174-x. Therefore, the latency of the predicate stack 140-2 is the same as the latency of the functional unit 130-4 when the multiply unit 169 is employed. When the iselect command is present, then the latency for the write enable signal WEN is determined by the register stages 176-1 to 176-x1 which matches the latency of the operand through the by pass consisting of the multiplexers in the functional unit 130-2. The input stage 176-1 of stack 176 is loaded with a 1 whenever an Isel operation is decoded and is otherwise loaded with a 0. Therefore, OR gate 177 will always be satisfied by a 1 from stage 176-x for Isel operations. However, for other operations, the predicate value in stage 174-x1 will determine whether gate 177 is satisfied to generate the WEN signal.

An address stack 133-2 includes a register 178-1, a register stack 178-2 through 178-x, a register stack 178'-2 through 178'-x, a multiplexer which receives inputs from the stacks 178 and 178', and a register 178-x1. The address stack 133-2 has a latency which, in a similar manner to the latency of the control 131-2 and the latency of the stack 140-2, is the same as the latency of the functional unit 130-2, both under the condition of the latency through the multiplier 169 or the latency through the multiplexers 171 and 172. As an alternative, the stacks 170', 176, and 178' may have a different number of stages and latency than stacks 170, 174 and 178.

In FIG. 9, the multiplexer in the stack 133-2, like the multiplexer 172, bypasses the register stages 178-2 through 178-x when the Isel opcode is decoded by decoder 137-2. When the Isel command is not decoded, then multiplexer in the stack 133-2 selects the output from stage 178-x as the input to stage 178-x1. In this way, the latency of the address stack 133-2 remains the same as that of the functional unit 130-4.

The Isel structure of FIG. 9 (MUX's 171, 172, ...) is typical of the select structure in each processor 32 of FIGS. 2 and 3. The select employed in floating point processor 32-1 is identified as "Fsel", for example.

Processing Element Multiconnect—FIG. 10

In FIG. 10, the multiconnect elements 34 are organized in an array 30 corresponding to a portion of the data cluster of FIG. 3. Only the detail is shown for the processor 32-2 of FIGS. 2, 3 and 9 and the corresponding multiconnect elements 34. In particular, the third column of multiconnect elements 34 designated D(1,3), D(2,3), D(3,3), and D(4,3), all have an output which connects in common to the 33-bit first data in (DI1) bus 36-2. Additionally, the general purpose register element (GPR)(3) has an output which connects to the bus 36-2. Each of these elements is similarly addressed by the 9-bit S1 source bus 59 through the invariant address units 12.

In FIG. 10, the fourth column of multiconnect elements 34 includes the elements GPR(4), D(1,4), D(2,4), D(3,4), and D(4,4). The output of each of these elements in column four connects to the 33-bit second data input (DI2) bus 37-2. Also each of the multiconnect elements in column four is addressed by the 9-bit second source S2 bus 61 through an invariant address unit 12'. Data from any one of the column three multiconnect elements addressed by the S1 bus 59 provides data on the DI1 bus 36-2. Similarly data from any one of the multiconnect elements in column four is addressed by the S2 bus to provide data on the DI2 bus 37-2. The processor (PE) 32-2 performs an operation on the input data from buses 36-2 and 37-2 under control of the opcode on bus 63. Bus 63 is the OP (6:0) field from the output 54-2 of the instruction register 53 of FIG. 4. The operation performed by the processor 32-2 has a result which appears on the data outbus 35-2. The data outbus 35-2 connects as an input to each of the multiconnect elements comprising the dmc2 row of the data cluster. The dmc2 row includes the multiconnect elements D(3,1), D(3,2), D(3,3), D(3,4), and D(3,5).

In FIG. 10, the destination address appears on the D1 bus 64 which is derived from one of the fields in the output 54-2 from the instruction register 53 of FIG. 4. The bus 64 connects to invariant address unit 12'-1 and 12'-2 forming the address on bus 164. The address is delayed in address stack 1 to provide the destination address on bus 264. The data output bus 35-2 also connects in common to the GPR bus 65 which forms a data input to the mc0 row of GPR elements, GPR(1) to GPR(13) which form the GPR multiconnect 49.

In FIG. 10, the destination address output from processing element 32-1 on line 264-1, together with the write enable, WEN, line 96-1, form the bus 271 which are connected to each of the elements in the dmc1 multiconnect comprised of the elements D(4,1), ..., D(4,5). Also, the line 96-1 and the bus 264-1 connect to the common GPR destination address bus 270 which connects to address, when enabled, each of the elements in the GPR multiconnect 49. In a similar manner, the processing element 32-2 has its write enable, WEN, line 96-2 connected together with the destination address bus 264-2 to form the bus 273 which addresses the dmc2 row of multiconnect elements 34, including the elements D(3,1), . . . , D(3,5). The line 96-2 and the bus 264-2 also connect to the common bus 270 which provides the destination address and enable to the GPR multiconnect 49. The destination address bus 270 connects in common to all of the processing elements, such as processing elements 32-1 and 32-2, but only one of the destination addresses is active at any one time to provide an output which is to be connected in common to the GPR multiconnect 49. As indicated in FIG. 9, the WEN enable signal on line 96-2 enables the outgating of the registers 170-x1 and 178-x1 which provide the data output on bus 35-2 and the destination address output on bus 264-2. This gating-out of the registers ensures that only one element will be connected to the common bus 65 and one element to the common bus 270 for transmitting destination addresses and data to the GPR multiconnect 49. In a manner similar to FIG. 9, all of the other processing elements 32 of FIG. 2 and FIG. 3 which connect to the GPR bus 65 and the corresponding destination address bus 270 (see FIG. 10) are enabled by the respective write enable signal, WEN, to ensure that there is no contention for the common buses to the GPR multiconnect 49.

In FIG. 10, the pair of multiconnect elements D(3,3) and D(3,4) comprise one physical module 66. The combination of two pairs of logical modules, like modules D(3,3), and D(3,4) is arbitrary as any physical implementation of the multiconnect array may be employed.

The preceding discussion of the circuit of FIG. 10 has concentrated on connections between the elements D(3,3), D(3,4), D(4,3) and D(4,4) on the one hand and the processors 32-1 and 32-2 on the other hand. It will be apparent that similar connections exist between others of the elements 34 which are shown in FIG. 10 and others of the processors which are shown in FIG. 3. Thus, for example, various rows of elements 34 receive data from data buses 35A and 35B which are similar to the buses 35-1 and 35-2 except that they connect with others of the processors 32. Similarly, various columns of the elements 34 are addressed by address buses 59A, 59B and 59C which are similar to or which may be comprised in the bus 59 or the bus 61.

Physical Multiconnect Module FIG. 11

In FIG. 11, the module 66 is a typical implementation of two logical modules, such as D(3,3) and D(3,4) of FIG. 10. In FIG. 11, a first (C1) chip 67 and a second (C2) chip 68 together form the logical modules, D(3,3), and D(3,4), of FIG. 10. However, one half of the D(3,3) multiconnect element is in the C1 chip 67 and one half is in the C2 chip 68. Similarly, one half of the D(3,4) logical multiconnect appears in each C1 chip 67 and C2 chip 68. Both the chips 67 and 68 receive the S1 source bus 59 and the S2 source bus 61. The S1 source bus 59 causes chips 67 and 68 to each provide the 17-bit data output C1(A0) and C2(A0), respectively, on output lines 69 and 70. The outputs on lines 69 and 70 are combined to provide the 33-bit DI1 data bus 36-2.

In a similar manner, the address on the S2 address bus 61 addresses both the C1 chip 67 and the C2 chip 68 to provide the C1(B0), and the C2(B0) 17-bit outputs on lines 71 and 72, respectively. The data outputs on lines 71 and 72 are combined to form the 33-bit data DI2 on bus 37-2.

The DI1 and DI2 data buses 36-2 and 37-2 connect as the two inputs to the processor 32-2 of FIG. 10.

In FIG. 11, the D1 destination bus 273 connects as an input to both the C1 chip 67 and the C2 chip 68. The destination address and the WEN signal on the D1 bus 273 causes the data out data on the D0 bus 35-2 to be stored into both the C1 chip 67 and the C2 chip 68.

Figure 13:
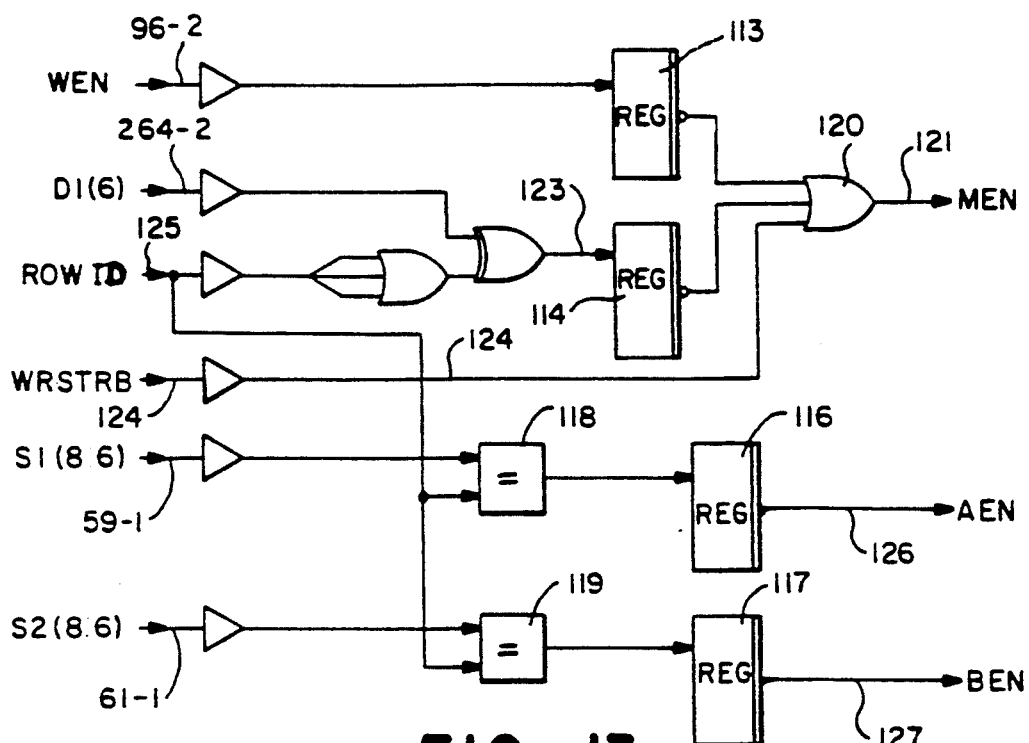

Multiconnect Chip FIGS. 12 and 13

In FIGS. 12 and 13, the C1 chip 67 of FIG. 11 is shown as typical of the chips 67 and 68 and the other chips in each of the other multiconnect elements 34 of FIG. 10, taken in pairs.

In FIG. 12, two 64×10 random access memories (RAMs) 45 and 46 are the data storage elements. The data out bus 35-2 connects into a 17-bit write data register 73. Register 73 in turn has a 10-bit portion connected to the data input of the RAM 46 and a 7-bit portion to the RAM 45. Data is stored into the RAM 45 and RAM 46 at an address selected by the multiplexer 74. Multiplexer 74 obtained the address for storing data into RAMS 45 and 46 from the write address register 75. The register 75 is loaded by the write address from the D1(5:0) bus 264-2 which is the low order 6 bits derived from the D1 bus 64 from the instruction register 53 of FIG. 4 through stack 133-2 of FIGS. 9 and 10.

Data is read from the RAM 45 and RAM 46 sequentially in two cycles. In the first cycle, data is stored into the 17-bit latch 89. In the second cycle, data is read from the RAMS 45 and 46 and stored into the 17-bit register 79 while the data in the latch 89 is simultaneously transferred to the register 78. The data stored into register 78 is accessed at an address location selected by the multiplexer 74. In the first cycle, multiplexer 74 selects the address from the adder 76. Adder 76 adds the S1(5:0) address on bus 59-2 to the contents of the mcp register 82.

In the second read cycle, multiplexer 74 selects the address from the adder 77 to determine the address of the data to be stored into the register 79. Adder 77 adds the S2(5:0) address on bus 61-2 to the contents of the mcp register 82.

In FIG. 13, further details of the FIG. 12 multiconnect are shown. In FIG. 13, gate 120 generates the memory enable (MEN) signal on line 121 which controls writing into the RAMS 45 and 46 of FIG. 12. The MEN signal on line 21 is enabled only when the write enable (EN) signal on line 96, the signal on line 123 and the write strobe (WRSTRB) signal on line 124 are present. In the absence of any of these signals, the MEN signal on line 121 is not asserted and no write occurs into the RAMS 45 and 46.

In FIG. 13, the WEN signal on line 96 is generated by the corresponding processor, in the example being described, the processor 32-2, in FIG. 10. The processor 32-2 when it completes a task, provides an output on the output data bus 35-2 and generates the WEN signal unless inhibited by the predicate output on line 33-2. The WEN signal on line 96 is latched into the register 113 which has its inverted output connected to the ORgate 120.

In FIG. 13, the signal on line 123 is asserted provided that the row ID (ROWID) on line 125 is non-zero and provided the GPR register has not been selected as evidenced by the signal on line DI(6), line 64-1 being zero. Under these conditions, the line 123 is asserted and stored in the register 114. The double bar on a register indicates that it is clocked by the clock signal along with all the other registers having a double bar. If both registers 113 and 114 store a logical one, a logical zero on the strobe line 124 will force the output of gate 120 to a logical zero thereby asserting the MEN signal on line 121. If either of registers 113 or 114 stores a zero, then the output from gate 120 will remain a logical one and the MEN signal on line 121 will not be asserted.

In FIG. 13, the 3-bit input which comprises the ROWID signal on line 125 is hardwired to present a row ID. Each element 34 in FIGS. 3 and 10 is hardwired with a row ID depending on the row in which the element is in. All elements in the same row have the same ROWID.

In FIG. 13, comparator 118 compares the ROWID signal on line 125 with the high order 3-bit address S1(8:6) on line 59-1 from the instruction register 53 from FIG. 4. If a comparison occurs, a one is stored into the register 116 to provide a zero and assert the A enable (AEN) signal on line 126. The AEN signal on line 126 connects to the ANDgate 80 to enable the output from the register 78 in FIG. 12.

In a similar manner, the comparator 119 compares the ROWID signal on line 125 with the three high order bits S2(8:6) on lines 61-1 from the instruction register 53 of FIG. 4. If a compare occurs, a one is clocked into the register 117 to enable the B enable signal (BEN) on line 127. The BEN signal one line 127 connects to the ANDgate 81 in FIG. 12 to enable the contents of register 79 to be gated out from the chip 67 of FIG. 11.

ICR ELEMENT FIG. 14

In FIG. 14, a typical one of the elements 22, namely element 22-2, which form the row 29 of ICR elements in FIG. 3 is shown. The ICR register 92 provides a 1-bit predicate output on line 33-3. The ICR register 92 is addressed by a 7-bit address from the adder 103. Adder 103 forms the predicate address by adding the offset address in the ICP pointer register 102 to the predicate (PD) address on the 7-bit bus 167 which comes from the instruction register 53 of FIG. 4 as connected through the processor 32-2 of FIG. 10.

The iteration control register (ICR) 92 can have any one of its 128 locations written into by the 1-bit ICR data (ICRD) line 108 which comes from the timing and loop control 56 of FIG. 4. The logical one or zero value on line 108 is written into the ICR 92 when the write interval control register (WICR) signal on line 107 is asserted. The enable signal on line 107 is derived from the timing and loop control 56 of FIG. 4. The address written into in register 92 is the one specified by the adder 103.

In FIG. 14, the ICP register 102 stores a pointer which is an offset address. The contents of register 102 are initially cleared whenever the (ICPCLR) line 109 from the timing and loop control 56 of FIG. 4 is asserted. When line 109 is asserted, the output of gate 106 is a zero so that when ICPEN is enabled the register 102 is clocked to the all zero condition. When the ICPCLR line 109 is not asserted, then the assertion of the enable signal ICPEN on line 110 causes register 102 to be incremented by one unit. In the embodiment described, the incrementing of the register 102 occurs by subtracting one in the subtracter 105 from the current value in register 102. The incrementing process is actually a decrementing of the contents of register 102 by 1.

Figure 15:
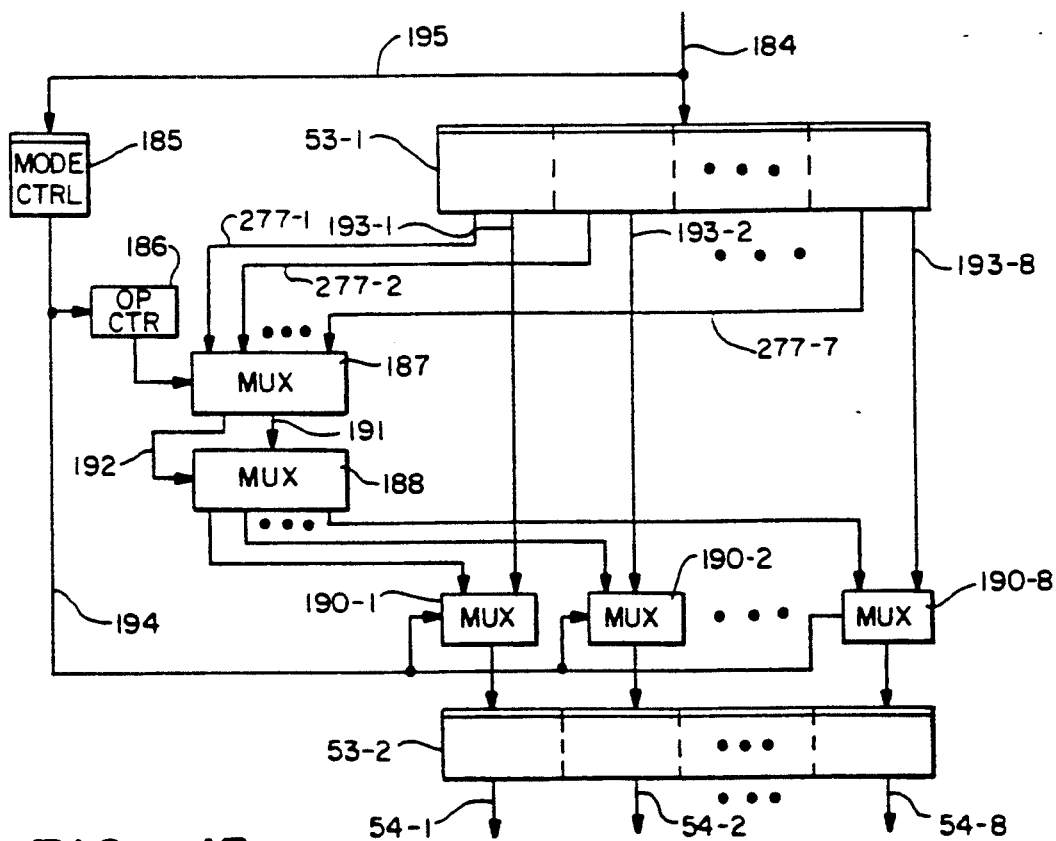
FIG. 15 depicts a block diagram of an instruction unit for use with multiple operation and single operation instructions.

Single And Multiple Operation Unit—FIG. 15

In FIG. 15, the single operation/multiple operation unit which forms a modification to the instruction unit of FIG. 4 is shown. In FIG. 4, the instruction register 53 is replaced by the entire FIG. 15 circuit. The input bus 184 from the instruction cache 52 of FIG. 4 connects, in FIG. 15, to the input register 53-1. Register 53-1 as an input receives information in the same way as register 53 of FIG. 4. The output from the unit of FIG. 15 from ,register 53-2 on the buses 54-1, 54-2, . . . , 54-8 is similar to the outputs from the register 53 in FIG. 4.

In FIG. 15, for multiple operations, the input register 53-1 is connected directly to the output register 53-2 through the multiplexers 190. Register 53-1 includes a stage for each operation to be executed, each stage including an opcode field, source and destination offset addresses, predicate fields and other fields as previously described in connection with FIG. 4. The output from each stage of register 53-1 appears on buses 193-1, 193-2, . . . , 193-8, having the same information as buses 54-1, 54-2, . . . , 54-8 of FIG. 4. These buses 193-1 through 193-8 in turn connect to the multiplexers 190-1, 190-2, . . . , 190-8 which have outputs which connect in turn to the corresponding stages of the output register 53-2 so as to directly provide the outputs 54-1, 54-2, . . . , 54-8, respectively. The outputs from input register 53-1 are connected directly as inputs to the output register 53-2 when the control line 194 from the mode control register 185 is asserted to indicate a multiop mode of operation.

When the mode control 185 does not assert line 194, indicating a single operation mode, the multiplexers 190-1 through 190-8 are active to select outputs from the selector 188. Only one output from selector 188 is active at any one time, corresponding to the single operation to be performed, and the other outputs are all nonasserted.

Selector 188 derives the information for a single operation from the multiplexer 187. Selector 188, under control of the control lines 192, selects one of the multiplexers 190-1 through 190-8 to receive the single operation information from multiplexer 187. The particular one of the operations selected corresponds to one of the multiplexers 190-1 through 190-8 and a corresponding one of the output buses 54-1 through 54-8.

Multiplexer 187 functions to receive as inputs each of the buses 277-1 through 277-7 from the input register 53-1. Note that the number (7) of buses 277-1 through 277-7 differs from the 8 buses 190-1 to 190-8 since the field sizes for single operation instructions can be different than for multiple operation instructions. Multiplexer 187 selects one of the inputs as the output on buses 191 and 192. The particular one of the inputs selected by multiplexer 187 is under control of the operation counter 186. Operation counter 186 is reset each time the control line 194 is nonasserted to indicate loading of single operation mode instructions into register 53-1 and register 185. Thereafter, the operation counter 187 is clocked (by the system clock signal not shown) to count through each of the counts representing the operations in input register 53-1.

Part of the data on each of the buses 193-1 through 193-8 is the operation code which specifies which one of the operations corresponding to the output buses 54-1 through 54-8 is to be selected. That opcode information appears on bus 192 to control the selector 188 to select the desired one of the multiplexers 190-1 through 190-8.

With this single operation mode, the input register 53-1 acts as a pipeline for single operations. Up to eight single operations are loaded at one time into the register 53-1. After the single operations are loaded into the register 53-1 over bus 184, each of those operations is selected by multiplexer 187 for output to the appropriate stage of the output register 53-2. Each new instruction loads either multiple operations or single operation information into register 53-1. Each time a multiple operation or a single operation appears on the bus 184, a mode control field appears on line 195 for storage in the mode control register 185.

When the mode control 185 calls for a multiple operation, then the contents of register 53-1 are transferred directly into register 53-2. When the mode control 185 calls for single operation, the operations stored into register 53-1 in parallel are serially unloaded through multiplexers 187 and 188 one at a time, into the output register 53-2.

The computer of system 3, using the instruction unit of FIG. 15, switches readily between multiple operation and single operation modes in order to achieve the most efficient operation of the computer system. For those programs in which single operation execution is efficient, the single operation mode is more desirable in that less address space is required in the instruction cache and elsewhere in the system. For example, up to eight times as many single operation instructions can be stored in the same address space as one multiop instruction. Of course, the number of concurrent multiple operations (eight in the FIG. 15 example) is arbitrary and any number of parallel operations for the multiple operation mode can be specified.

Operation

The operation of the invention is described in connection with the execution of a number of programs. Each program is presented in FORTRAN source code form and in the kernel-only code form. The kernel-only code is executed by the computer of FIG. 3 in which the instructions are fetched by the I unit 32-7 and the computations are performed by the processors 32 using the data multiconnect 30 and address multiconnect 31.

TABLES 1-1 to 1-6 Kernel-Only Code

TABLE 1-1 depicts a short vectorizable program containing a D0 loop. The loop is executed N times(R=10, see Term Table) for i from 1 to N. The program does not exhibit any recurrence since the result from one iteration of the loop is not utilized in a subsequent iteration of the loop.

TABLE 1-1

| VECTORIZABLE LOOP |
|---|
| DO 10 i = 1,N |
| A = XR(i) * YR(i) − XI(i) * YI(i) |
| B = XR(i) * YI(i) + XI(i) * YR(i) |
| XR(i) = A + TR(i) |
| XI(i) = B + TI(i) |
| YR(i) = A − TR(i) |
| YI(i) = B − TI(i) |
| 10 CONTINUE |

In TABLE 1-2, a listing of the operations utilized for executing the loop of TABLE 1-1 is shown. The operations of TABLE 1-2 correspond to the operations performable by the processors 32 of FIG. 3. Particularly, with reference to FIG. 3, the address add, AAd1, is executed by processor 32-5, address add, AAd2, is executed by processor 32-6, the Mem1read by processor 32-3, the Mem2read by processor 32-4, and the floating-point multiply(FMpy), add(Fadd), subtract(Fsub) by processor 32-1, and the Brtop by the I unit processor 32-7.

In TABLE 1-2, operation 5 by way of example adds the operand @XRI[1], from the address multiconnect 31 (row amc5:36-6) to the operand % r1 from the GPR multiconnect 49 (mc0, column 37-3) and places the result operand @XRI in the address multiconnect 31 (amc5). Operation 9 as another example reads an operand XRI from the Mem2 processor 32-14 and stores the operand in row 4 of the data multiconnect 31 (dmc4). The address from which the operand is accessed is calculated by the displacement adder processor 32-9 which adds a literal value of 0(#0 input on line 44 from the instruction) to the operand @XRI from row 5 of the address multiconnect 31 (amc5) which was previously loaded by the result of operation 5. The other operations in TABLE 1-2 are executed in a similar manner.

In TABLE 1-3, the scheduled initial instructions, $I_l$, for the initial instruction stream IS, where l is 1, 2, ..., 26 are shown for one iteration of vectorizable loop of TABLE 1-1 and TABLE 1-2. In TABLE 1-3, the Iteration Interval(II) is six cycles as indicated by the horizontal-lines after each set of six instructions. Each $l^{th}$-initial instruction in TABLE 1-3 is formed by a set of zero, one or more operations, $O^l_0, O^l_1, O^l_2, \ldots, O^l_n, \ldots, O^l_{(N-1)}$, initiated concurrently, where $0 \leq n \leq (N-1)$, where N is the number(7 in TABLE 1-3) of concurrent operations and processors for performing operations and where the operation $O^l_n$ is performed by the $n^{th}$-processor in response to the $l^{th}$ initial instruction. The headings FAdd, FMpy, Mem1, Mem2, AAd1, AAd2 and IU refer to the processors 32-1, 32-2, 32-3, 32-4, 32-5, 32-6, and 32-7, respectively, of FIG. 3. By way of example, instruction 1 uses two operations, AAd1 and AAd2 in processors 32-5 and 32-6. Note that instructions 7, 8 and 9 have zero operations and are examples of "NO OP's".

TABLE 1-3 is a loop, LP, of L initial instruction $I_0, I_1, I_2, \ldots, I_l, \ldots, I_{(L-1)}$, where L is 26. The loop, LP, is part of the initial instruction stream IS in which execution advances from $I_0$ toward $I_{(L-1)}$.

In TABLE 1-3 the number in the T column indicates the instruction number and the number in the OP column indicates the number of processors that are active for each instruction.

TABLE 1-3 is divided into J stages(J=5 for TABLE 1-3), $S^l_n$, equal to 0, 1, ..., 4. Each operation, $\overline{O}^{k,l}_n$, in an l-instruction has a corresponding stage number.

In TABLE 1-4, the schedule of overlapped instructions is shown for iteration of the vectorizable loop of TABLE 1-2. In TABLE 1-4, a new iteration of the loop begins for each iteration interval (II) that is, at T1, T7, T13, T19, T25, and so on. The loop iteration that commences at T1 completes at T26 with the Mem1, Mem2 operations. In a similar manner, the loop iteration that commences at T7 completes at T32. The iteration that commences that T13 completes at T38. A comparison of the number of operations, the OP column, between TABLE 1-3 and TABLE 1-4 indicates that the TABLE 1-4 operation on an average includes a greater number of operations per instruction than does the TABLE 1-3. Such operation leads to more efficient utilization of the processors in accordance with the present invention.

TABLE 1-2

GRAPH REPRESENTATION FOR THE VECTORIZABLE LOOP

```
1   *       r1 contains 4
2   *       DO 10 i = 1,N
3   *         A = XR(i) * YR(i) - XI(i) * YI(i)
4   *         B = XR(i) * YI(i) + XI(i) * YR(i)
5           @XRI :- AAd1 ( @XRI[1] %r1 )
6           @XII :- AAd2 ( @XII[1] %r1 )
7           @YRI :- AAd1 ( @YRI[1] %r1 )
8           @YII :- AAd2 ( @YII[1] %r1 )
9           XRI :- Mem1read ( #0 @XRI )
10          XII :- Mem1read ( #0 @XII )
11          YRI :- Mem2read ( #0 @YRI )
12          YII :- Mem1read ( #0 @YII )
13          M1 :- FMpy ( XRI YRI )
14          M2 :- FMpy ( XII YII )
15          M3 :- FMpy ( XII YRI )
16          M4 :- FMpy ( XRI YII )
17          A :- Fsub ( M1 M2 )
18          B :- Fadd ( M3 M4 )
19
20  *       XR(i) = A + TR(i)
21  *       XI(i) = B + TI(i)
22  *       YR(i) = A - TR(i)
23  *       YI(i) = B - TI(i)
24          @TRI :- AAd1 ( @TRI[1] #r1 )
25          @TII :- AAd2 ( @TII[1] #r1 )
26          TRI :- Mem2read ( #0 @TRI )
27          TII :- Mem1read ( #0 @TII )
28          XRIN :- FAdd ( TRI A )
29          XIIN :- FAdd ( TII B )
30          YRIN :- Fsub ( TRI A )
31          YIIN :- Fsub ( TII B )
32          $W1 :- Mem2write ( XRIN #0 @XRI )
33          $W2 :- Mem1write ( XIIN #0 @XII )
34          $W3 :- Mem2write ( YRIN #0 @YRI )
35          $W4 :- Mem1write ( YIIN #0 @YII )
36          $BR :- Brtop ( #loop )
37  *10     CONTINUE
```

TABLE 1-3

SCHEDULE FOR ONE ITERATION OF THE VECTORIZABLE LOOP

| T | OP | FAdd | FMpy | Mem1 | Mem2 | AAd1 | AAd2 | IU |
|---|---|---|---|---|---|---|---|---|
| 1 | 2 | | | | | @YRI | @YRI | |
| 2 | 2 | | | | | @XRI | @XII | |
| 3 | 2 | | | | | @TRI | @XTII | |
| 4 | 3 | | | YII | YRI | | | BR |
| 5 | 2 | | | XII | XRI | | | |
| 6 | 2 | | | TII | TRI | | | |
| 7 | 0 | | | | | | | |
| 8 | 0 | | | | | | | |
| 9 | 0 | | | | | | | |
| 10 | 0 | | | | | | | |
| 11 | 1 | | M4 | | | | | |
| 12 | 1 | | M3 | | | | | |
| 13 | 1 | | M2 | | | | | |
| 14 | 1 | | M1 | | | | | |
| 15 | 0 | | | | | | | |
| 16 | 1 | B | | | | | | |
| 17 | 0 | | | | | | | |
| 18 | 1 | A | | | | | | |
| 19 | 1 | YIIN | | | | | | |
| 20 | 1 | XIIN | | | | | | |
| 21 | 1 | YRIN | | | | | | |
| 22 | 0 | | | | | | | |
| 23 | 1 | XRIN | | | | | | |
| 24 | 0 | | | | | | | |
| 25 | 2 | | | W4 | W3 | | | |
| 26 | 2 | | | W2 | W1 | | | |

TABLE 1-4

SCHEDULE FOR OVERLAPPED ITERATIONS OF THE VECTORIZABLE LOOP

| T | OP | FAdd | FMpy | Mem1 | Mem2 | AAd1 | AAd2 | IU |
|---|---|---|---|---|---|---|---|---|
| 1 | 2 | | | | | @YRI | @YII | |
| 2 | 2 | | | | | @XRI | @XII | |
| 3 | 2 | | | | | @TRI | @TII | |
| 4 | 3 | | | YII | YRI | | | BR |
| 5 | 2 | | | XII | XRI | | | |
| 6 | 2 | | | TII | TRI | | | |
| 7 | 2 | | | | | @YRI | @YII | |
| 8 | 3 | | | | | @XRI | @XII | |
| 9 | 3 | | | | | @TRI | @TII | |
| 10 | 3 | | | YII | YRI | | | BR |
| 11 | 3 | | M4 | XII | XRI | | | |
| 12 | 3 | | M3 | TII | TRI | | | |
| 13 | 3 | | M2 | | | @YRI | @YII | |
| 14 | 3 | | M1 | | | @XRI | @XII | |
| 15 | 2 | | | | | @TRI | @TII | |
| 16 | 4 | B | | YII | YRI | | | BR |
| 17 | 3 | | M4 | XII | XRI | | | |
| 18 | 4 | A | M3 | TII | TRI | | | |
| 19 | 4 | YIIN | M2 | | | @YRI | @YII | |
| 20 | 4 | XIIN | M1 | | | @XRI | @XII | |
| 21 | 3 | YRIN | | | | @TRI | @TII | |
| 22 | 4 | B | | YII | YRI | | | BR |
| 23 | 4 | XRIN | M4 | XII | XRI | | | |
| 24 | 4 | A | M3 | TII | TRI | | | |
| 25 | 6 | YIIN | M2 | W4 | W3 | @YRI | @YII | |
| 26 | 6 | XIIN | M1 | W2 | W1 | @XRI | @XII | |
| 27 | 3 | YRIN | | | | @TRI | @TII | |
| 28 | 4 | B | | YII | YRI | | | BR |
| 29 | 4 | XRIN | M4 | XII | XRI | | | |
| 30 | 4 | A | M3 | TII | TRI | | | |
| 31 | 4 | YII | M2 | W4 | W3 | | | |
| 32 | 4 | XIIN | M1 | W2 | W1 | | | |
| 33 | 1 | YRIN | | | | | | |
| 34 | 1 | B | | | | | | |
| 35 | 2 | XRIN | M4 | | | | | |
| 36 | 2 | A | M3 | | | | | |
| 37 | 4 | YIIN | M2 | W4 | W3 | | | |
| 38 | 4 | XIIN | M1 | W2 | W1 | | | |

In TABLE 1-5, the kernel-only schedule for the TABLE 1-1 program is shown. The 11 through 16 schedule of TABLE 1-5 is the same as the schedule for the stage including instructions 125 through 130 of TABLE 1-4. The operations of the kernel-only schedule are not all performed during every stage. Each stage has a different number of operations performed. The operations for 11 through 16 are identified as stage A, 17 through 112 are identified as stage B, 113 through 118 are identified as stage C, 119 through 124 are identified as stage D, 125 through 126 are identified as stage E.

TABLE 1-5

KERNEL-ONLY SCHEDULE AND CODE FOR THE VECTORIZABLE LOOP

| T | OP | FAdd | FMpy | Mem1 | Mem2 | AAd1 | AAd2 | IU |
|---|---|---|---|---|---|---|---|---|
| 1 | 6 | YIIN | M2 | W4 | W3 | @YRI | @YRI | |
| 2 | 6 | XIIN | M1 | W2 | W1 | @YRI | @XII | |
| 3 | 3 | YRIN | | | | @TRI | @TRI | |
| 4 | 4 | B | | YII | YRI | | | BR |
| 5 | 4 | XRIN | M4 | XII | XRI | | | |
| 6 | 4 | A | M3 | TII | TRI | | | |

In TABLE 1-6, the operation of TABLE 1-4 overlapped schedule is represented in terms of the stages of TABLE 1-3. For the first iteration(i=0), only those operations of stage A are executed. For the second iteration ($\bar{i}=1$), only those operations of stages A and B are executed. For the third iteration($\bar{i}=2$), the operations of stages A, B and C are executed. For the fourth iteration($\bar{i}=3$), the operations of stages A, B, C, and D are executed. Iterations 0, 1, 2, and 3 represent the prolog during which less than all of the operations of the kernel are executed.

The iterations 4, 5, and 6 of TABLE 1-6 represent the body of the loop and all operations of the kernel-only code are executed.

The iterations 7, 8, 9, and 10 of TABLE 1-6 represent the epilog of the loop and selectively fewer operations of the kernel-only code are executed, namely, B, C, D, and E; C, D, and E; D and E; and E.

The manner in which certain operations of the kernel-only code are enabled and disabled is under control of the predicate values stored in the ICR multiconnect 29. During the first execution, only the operations of the A stage are enabled by a predicate. This condition is indicated in TABLE 1-6 for $\bar{i}$ equal 0 by a 1 in the A column of ICR while all other columns have 0. Similarly, a 1 appears in the A and B columns of the ICR so as to enable the A and B operations in the $\bar{i}$ equal to 1 case, and so on for each case for $\bar{i}$ equal 2 through 10.

TABLE 1-6

Assume 5 stages, 7 iterations

| $\bar{i}$ | lc | esc | | ICR A B C D E 0 1 2 3 4 |
|---|---|---|---|---|
| 0 | 6 | 4 | A          | 1 0 0 0 0 |
| 1 | 5 | 4 | B A        | 1 1 0 0 0 |
| 2 | 4 | 4 | C B A      | 1 1 1 0 0 |
| 3 | 3 | 4 | D C B A    | 1 1 1 1 0 |
| 4 | 2 | 4 | E D C B A  | 1 1 1 1 1 |
| 5 | 1 | 4 | E D C B A  | 1 1 1 1 1 |
| 6 | 0 | 4 | E D C B A  | 1 1 1 1 1 |
| 7 | 0 | 3 | E D C B    | 0 1 1 1 1 |
| 8 | 0 | 2 | E D C      | 0 0 1 1 1 |
| 9 | 0 | 1 | D D        | 0 0 0 1 1 |
| 10 | 0 | 1 | E         | 0 0 0 0 1 |

TABLES 2-1, 2-2, 2-3 Recurrence On Loop

TABLE 2-1 is an example of a FORTRAN program having a recurrence on a loop. The loop is executed five times(R=5) for i from 3 to 7. A recurrence exist because the current value in one iteration of the loop, F(i), is determined using the results, F(i−1) and F(i−2) from previous iterations of the loop.

TABLE 2-1

```
INTEGER F(100)
F(1)=1
F(2)=1
DO 10 i=3,7
F(i)=F(i−1)+F(i−2)
CONTINUE
```

TABLE 2-1-continued

| 10 | END |
|---|---|

TABLE 2-2 depicts the initial conditions that are established for the execution of the TABLE 2-1 program using the computer of FIG. 3. Referring to FIG. 3, the GPR multiconnect 49 location 2 is set to 4(% r2=4), the data multiconnect 30 row 1, location 63 is set to the value of F(1) set by the program in memory equal to 1[dmc 1:63=F(1)=1], the data multiconnect row 1, location 0 is set to the value of F(2) set by the program in memory equal to 1[dmc 1:0=F(2)=1], the loop counter 90 of FIG. 4 is set to 4[lc=4], the epilog stage counter is set to 1[esc=1]. With these initial conditions the kernel-only code of TABLE 2-3 is executed to execute the program of TABLE 2-1.

TABLE 2-2

| Required Initial conditions: |
|---|
| %r2=4 |
| dmc 1:63=F(1)=1 |
| dmc 1:0=F(2)=1 |
| lc=4 |
| esc=1 |
| amc 5:63 points to F(3) |

TABLE 2-3

| $I_k$ k | Integer IAdd | address AAd1 | 1 unit | memory Mem1 |
|---|---|---|---|---|
| 0 | IAdd{0} 1:63,1:0 =1:62 | AAd1{0} %r2,5:63 =5:0 | | m1write{1} 1:63,5:1 |
| 1 | | | Brtop | |
| 2 | | | | |
| 3 | | | | |

In TABLE 2-3 for each k-instruction, the first line indicates the operation to be performed together with the offset {} of the operation relative to the multiconnect pointer, the second line the multiconnect addresses of the source operands, and the third line the multiconnect address of the result operand.

For the 0-instruction, the integer add (processor 32-1 of FIG. 3), IAdd, adds the contents of the data multiconnect 30 location 1:63 (accessed on bus 36-1 from location 63 in row 237-1 of FIG. 3) to the contents of the data multiconnect location 1:0(accessed on bus 36-2 from location 0 in row 237-1 of FIG. 3) and places the result in data multiconnect location 1:62 (stored on bus 35-1 to location 62 in row 237-1 of FIG. 3) all with an offset of 0 relative to the multiconnect pointer.

For the 0-instruction, the address add1 (processor 32-5 of FIG. 3), AAd1, adds the contents of the GPR multiconnect 49 location % r2(accessed on bus 36-6 of FIG. 3) to the contents of the address multiconnect location 5:63 (accessed on bus 37-3 from location 63 in row 48-2 of FIG. 3) and places the result in address multiconnect location 5:0 (stored over bus 47-3 to locations 0 in row 48-2 of FIG. 3) all with an offset of 0 relative to the multiconnect pointer The function of the address add is to calculate the address of each new value of F(i) using the displacement of 4 since the values of F(i) are stored in contiguous word addresses (four bytes).

TABLE 2-4

| T | lc | esc | i | Integer IAdd | Address AAd1 | IU | Memory Mem1 |
|---|----|-----|---|--------------|--------------|----|-------------|
| 0 | 4 | 1 | 0 | IAdd{0}<br>1:63,1:0<br>=1:62 | AAd1{0}<br>%r2,5:63<br>=5:0 | | |
| 1 | | | | | | Brtop | |
| 2 | | | | | | | |
| 3 | | | | | | | |
| 4 | 3 | 1 | 1 | IAdd{0}<br>1:63,1:0<br>=1:62 | AAd1{0}<br>%r2,5:63<br>=5:0 | | m1write{1}<br>1:63,5:1 |
| 5 | | | | | | Brtop | |
| 6 | | | | | | | |
| 7 | | | | | | | |
| 8 | 2 | 1 | 2 | IAdd{0}<br>1:63,1:0<br>=1:62 | AAd1{0}<br>%r2,5:63<br>=5:0 | | m1write{1}<br>1:63,5:1 |
| 9 | | | | | | Brtop | |
| 10 | | | | | | | |
| 11 | | | | | | | |
| 12 | 1 | 1 | 3 | IAdd{0}<br>1:63,1:0<br>=1:62 | AAd1{0}<br>%r2,5:63<br>=5:0 | | m1write{1}<br>1:63,5:1 |
| 13 | | | | | | Brtop | |
| 14 | | | | | | | |
| 15 | | | | | | | |
| 16 | 0 | 1 | 4 | IAdd{0}<br>1:63,1:0<br>=1:62 | AAd1{0}<br>%r2,1:0<br>=5:0 | | m1write{1}<br>1:63,5:1 |
| 17 | | | | | | Brtop | |
| 18 | | | | | | | |
| 19 | | | | | | | |
| 20 | 0 | 0 | 5 | | | | m1write{1}<br>1:63,5:1 |
| 21 | | | | | | Brtop | |
| 22 | | | | | | | |
| 23 | | | | | | | |

TABLE 2-4 depicts the operation of the TABLE 2-3 kernel-only code for the four loops (R=4) of TABLE 2-1 and five kernel loops ($\bar{R}$=5). The loop counter is decremented from 4 to 0 and the epilog stage counter is decremented from 1 to 0. The multiconnect address range is 0, 1, 2, 3, ..., 63 and wraps around so that the sequence is 60, 61, 62, 63, 0, 1, 2, ... and so on. The addresses are all calculated relative to the multiconnect pointer (mcp). Therefore, a multiconnect address 1:63 means multiconnect row 1 and location 63+mcp. Since the value of mcp, more precisely mcp($\bar{i}$), changes each iteration, the actual location in the multiconnect changes for each iteration.

The mcp-relative addressing can be understood, for example, referring to the integer add in TABLE 2-4. The function of the integer add is to calculate F(i−1)+F(i−2) (see TABLE 2-1). The value F(i−1) from the previous iteration (i−1) is stored in data multiconnect location 1:63. The value F(i−2) from the 2$^{nd}$ previous iteration (i−2) is stored in data multiconnect location 1:0. The result from the add is stored in data multiconnect location 1:62.

Referring to the IAdd instruction at T0, the result is stored at the address mcp(0)+62 when $\bar{i}$=0. Referring to the IAdd instruction at T4, one operand is accessed from the address mcp(1)+63 when $\bar{i}$=1. However, mcp(1) equals mcp(0)−1, so that [mcp(0)+62] equals [mcp(1)+63]. Therefore, the operand accessed by the IAdd instruction at T4 is the very same operand stored by the IAdd instruction at T0. Similarly, referring to the IAdd instruction at T8, the operand from 1:0 is accessed from mcp(2)+0. However, mcp(2) equals mcp(0)−2 and therefore, [mcp(0)+62] equals [mcp(2)+0] and the right-hand operand accessed by IAdd at T8 is the operand stored by IAdd at T0. Note that the execution does not require the copying of the result of an operation during one iteration of a loop to another location even though that result is saved for use in subsequent iterations and even though the subsequent iterations generate similar results which must also be saved for subsequent use. The invariant addressing using the multiconnect pointer is instrumental in the operations which have a recurrence on the loop.

TABLES 2-1, 2-5, 2-6: Single And Multiple Operations

TABLES 2-5 and 2-6 represent the single processor execution of the program of TABLE 2-1. TABLE 2-5 represents the initial conditions and TABLE 2-6 represents the kernel-only code for executing the program. In the single operation embodiment, only a single one of the processors of FIG. 3 is utilized during each instruction. Referring to TABLE 2-6 and FIG. 3, the 0-instruction for the IAdd uses processor 32-1, the 1-instruction for the AAd1 uses processor 32-5, the 2-instruction for Brtop uses I unit processor 32-7, and the 3-instruction for m1write uses processor 32-3. The invariant and relative addressing of the multiconnect units is the same as in the other examples described. The recurrence on the loop is the same for the TABLE 2-6 example as previously described for TABLE 2-4.

TABLE 2-5

Initial Conditions:

1:63 = F(1) = 1
1:0 = F(2) = 11
5:63 = address in main store space F(3)
%r2 = 4

TABLE 2-6

| Time | Unit | Operation | Source1 | Source2 | Destination |
|------|------|-----------|---------|---------|-------------|
| 0 | Integer | IAdd{0} | 1:63 | 1:0 | =1:62 |
| 1 | Address | AAd1{0} | %r2 | 5:63 | =5:0 |
| 2 | IU | BRtop | | | |

TABLE 2-6-continued

| Time | Unit | Operation | Source1 | Source2 | Destination |
|---|---|---|---|---|---|
| 3 | memory | m1write{1} | 1:63 | 5:1 | |

TABLES 3-1 To 3-5: Conditional On Recurrence Path

TABLE 3-1 is an example of a Fortran program which has a conditional on the recurrence path of a loop. The Fortran program of TABLE 3-1 is executed to find the minimum of a vector. The vector is the vector X which has a hundred values. The trial minimum is XM. The value of XM after completing the execution of the loop is the minimum. The integer M is the trial index and the integer K is the loop index.

The initial conditions for the kernel-only code for executing the loop of TABLE 3-1 are shown in TABLE 3-2. The general purpose register offset location 1 is set equal to 1 so that the value of K in TABLE 3-1 can be incremented by 1. The general purpose register offset location 4 is set equal to 4 because word (four bytes) addressing is employed. The addresses of the vector values are contiguous at word location. The multiconnect temporary value ax[1] is set equal to the address of the first vector value X(1). Similarly, the multiconnect temporary location XM[1] is set equal to the value of the first vector value X(1).

TABLE 3-1

EXAMPLE WITH CONDITIONAL ON RECURRENCE
PATH FIND THE FIRST MINIMUM OF A VECTOR

```
        INTEGER M,K
        REAL X(100), XM
        XM = X(1)
        M = 1
        DO 10 K = 2,100
        IF (X(K).GT.XM) GO TO 10
        XM = X(K)
        M = K
10      CONTINUE
```

TABLE 3-2

Initial Conditions:

%r1 = 1, %r4 = 4
ax[1] = points to addr(x(1))
m[1] = x(1)
xm[1] = has value x(1)

In TABLE 3-3, the kernel-only code for the program of TABLE 3-1 is shown.

In TABLE 3-1, the recurrence results because the IF statement uses the trial minimum XM for purposes of comparison with the current value X(K). However, the value of XM in one iteration of the loop for the IF statement uses the result of a previous execution which can determine the value of XM as being equal to X(K) under certain conditions. The conditions which cause the determination of whether or not XM is equal to X(K) are a function of the Boolean result of comparison "greater than" in the IF statement. Accordingly, the TABLE 3-1 program has a conditional operation occurring on the recurrence path of a loop.

TABLE 3-3 is a representation of the kernel-only code for executing the program of TABLE 3-1. Referring to TABLE 3-3, the recurrence exists and is explained by the follow cycle of operand dependency within the kernel-only code. For convenience reference is first made to the "greater than" comparison, Fgt, which occurs in instruction 11. The comparison in instruction 11 is between the trial minimum XM and the current value being tested, X, as derived from the vector. The comparison in instruction 11 creates a Boolean result and that result is then used in the next iteration of the loop when it is stored into a predicate by the Stuffbar operation of instruction 3. In instruction 3, the Boolean value is stored into the predicate at the sw [2] location, and that location is thereafter used in instruction 6 to select the new trial minimum using the FMsel operation. The index for the trial minimum is stored in instruction 6 using the Isel operation. The trial minimum XM stored in instruction 6 by the FMsel operation is then used again in the instruction 11 to do the "greater than" comparison, thereby returning to the starting point of this analysis.

TABLE 3-3

| $I_k$ k | Alu/ IAdd | FMpy | Memory Mem1 | Memory Mem2 | AAd1 | IU |
|---|---|---|---|---|---|---|
| 0 | IAdd{0} k[1],%r1 =k | | | | AAd1{0} ax[1],%r4 =ax | |
| 1 | | | | | | |
| 2 | | | | | | |
| 3 | | | Stuffbar{2} Isel[2] =sw[2] | m2read{2} ax =x | | |
| 4 | | | | | | |
| 5 | | | | | | |
| 6 | Isel{sw[2]} k[2],m[3] =m[2] | FMsel{sw[2]} x[2],xm[3] =xm[2] | | | | |
| 7 | | | | | | |
| 8 | | | | | | |

TABLE 3-3-continued

| $\bar{I}_k$ k | Alu/ IAdd | FMpy | Memory Mem1 | Memory Mem2 | AAd1 | IU |
|---|---|---|---|---|---|---|
| 9 | | | | | | Brtop |
| 10 | | | | | | |
| 11 | Fgt{1} x[1],xm[2] =Isel[1] | | | | | |

The TABLE 3-2 and TABLE 3-3 example above utilized variable names for the locations within the multiconnect units.

TABLE 3-4 and TABLE 3-5 depict the same example using absolute multiconnect addresses (relative to mcp).

TABLE 3-4

Initial Conditions:

%r1=1, %r4=4
5:1 <= points to Addr(x(1))
1:11 <= x(1)(DMC)
2:1 <= x(1)

TABLE 3-5

| $\bar{I}_k$ k | Alu/IAdd | FMpy | Mem1 | Mem2 | AAd1 | IU |
|---|---|---|---|---|---|---|
| 0 | IAdd{0} 1:1,%r1 =1:0 | | | | AAd1{0} 5:1,%r4 =5:0 | |
| 1 | | | | | | |
| 2 | | | | | | |
| 3 | | | Stuffbar{2} 1:22 =icr12 | m2read{0} 5:0 =4:0 | | |
| 4 | | | | | | |
| 5 | | | | | | |
| 6 | Isel{12} 1:2,1:11 =1:12 | FMsel{12} 4:2,2:2 =2:2 | | | | |
| 7 | | | | | | |
| 8 | | | | | | |
| 9 | | | | | | Brtop |
| 10 | | | | | | |
| 11 | Fgt{1} 4:1,2:2 =1:21 | | | | | |

TABLES 4-1 TO 4-4: Complex Conditionals Within Loop

The TABLE 4-1 is an example of a complex program having a conditional on the loop, but without any recurrence. Of course, recurrence processing can be handled in the same manner as the previous examples.

TABLE 4-2 depicts the kernel-only code with the initial conditions indicated at the top of the table.

TABLE 4-3 depicts the multiconnect addresses (relative to mcp) for the TABLE 4-2.

TABLE 4-1

| | |
|---|---|
| | DO 12 I=1,N |
| 1 | X = D(I) |
| 2 | IF (X.LT.4) GO TO 9 |
| 3 | X = X + 3 |
| 4 | X = SQRT(X) |
| 5 | IF (X.LT.3) GO TO 12 |
| 6 | X = X + 4 |
| 7 | X = SQRT(X) |
| 8 | GO TO 12 |
| 9 | IF (X.GT.0) GO TO 5 |
| 10 | X = X + 5 |
| 11 | X = 2*x |
| 12 | D(I) = X |

TABLE 4-2

%r1=1, %r4=4
ax[1] <— points to addr(x(0)) element prior to x(1)

| | FAdd/1alu | Multiplier | Mem1 | AAd1 | IU |
|---|---|---|---|---|---|
| 0 | Or{3}<br>j95[3],j45[3]<br>=j5[3] | | | AAdd {0}<br>ax[1],%r0<br>=ax[0] | |
| 1 | Isel{d3[3]}<br>x4[3],x1[3]<br>=x5i[3] | | Stuffbar{2}<br>c2[2]<br>=d3[2] | | |
| 2 | FAdd{4}<br>x5i[4],%r4<br>=x6[4] | | Stufficr{2}<br>c2[2]<br>=d9[2] | | |
| 3 | Fge{2}<br>x1[2],%r2<br>=nc2[2] | FMpy{d10[3]}<br>x10[3],%r2<br>=x11[3] | m1read{0}<br>ax[0],%r0<br>=x1[0] | | |
| 4 | FAdd{d3[2]}<br>x1[2],%r3<br>=x3[2] | | Stufficr{3}<br>j5[3]<br>=d5[3] | | |
| 5 | Fgt{d9[2]}<br>x1[2],%r0<br>=c9[2] | | | | |
| 6 | Isel{d10[5]}<br>x11[5] is12p[5]<br>=is12[5] | Sqrt{d6[4]}<br>x6[4]<br>=x7[4] | | | |
| 7 | Flt{d6[3]}<br>x5i[3],%r4<br>=c5[3] | | | | |
| 8 | Isel{2}<br>%r1,%r0<br>=j45[2] | Sqrt{d3[2]}<br>x3[2]<br>=x4[2] | | | |
| 9 | Isel{d9[2]}<br>%r1,%r0<br>=j95[2] | | Stuffbar{d9[2]}<br>c9[2]<br>=d10[2] | | |
| 10 | Flt{1}<br>x1[1],%r4<br>=c2[1] | | mwrite{5}<br>is12[5] | | Brtop |
| 11 | Isel{d6[4]}<br>x7[4],x4[4]<br>=is12p[4] | | Stuffbar{d5[3]}<br>c5[3]<br>=d6[3] | | |
| 12 | FAdd{d10[2]}<br>x1,%r5<br>=x10[2] | | | | |

TABLE 4-3

Register Assignments:

j5[3] = 1:12
ax[0] = a1:0
x5i[3] = 1:6
d3[2] = icr:12
x6[4] = 1:0
d9[2] = icr:14
nc2[2] = 1:2
x11[3] = 2:0
x1[0] = 3:0
x3[2] = 1:11
d5[3] = icr:11
c9[2] = 1:10
is12[5] = 1:15
x7[4] = 2:6
c5[3] = 1:14
j45[2] = 1:8
x4[2] = 2:3
j95[2] = 1:7
c2 = 1:9

TABLE 4-3-continued

Register Assignments:

is10[4] = 1:0
d6[3] = icr9
x10[2] = 1:12
is12p[4] = 1:30

While the invention has been particularly shown and described with reference to preferred embodiments thereof, it will be understood by those skilled in the art that the foregoing and other changes in form and details may be made therein without departing from the spirit and scope of the invention.

What is claimed is:

1. A computer system for performing a plurality of iterations of a loop of instructions having a branch, the system comprising:

storage means for storing a set of instructions including a plurality of instructions defining a loop having a branch;

processor means having a plurality of processors each responsive to an instruction to perform an operation on an input operand and provide an output operand;

instruction means operative:
- to receive the set of instructions from the storage means,
- to determine which of the instructions are to be executed during a given iteration of the loop and whether any of said instructions is a branch instruction;
- to provide the instructions which are to be executed during said iteration to the processor means approximately simultaneously, each instruction begin provided to a different one of the processors and all of said instructions which are to be executed during said iteration being executed approximately simultaneously by the processors,
- to enable different ones of the processors as a function of whether a branch instruction is to be executed whereby which of the instructions are actually executed during a given iteration is determined by whether a branch instruction is to be executed during that iteration, and
- to generate input address offsets and output address offsets associated with various ones of the provided instructions;

invariant address means operative to provide a multiconnect pointer, to modify the multiconnect pointer in response to repeated execution of the provided instructions, and to combine the pointer with the address offsets to generate input and output operand addresses, respectively; and multiconnect storage means having a plurality of addressable storage locations, operative to receive the operand addresses, furnish any operand which is stored at a location identified by the input operand address to the processor means, and store any output operand from the processor means at a location identified by the output operand address.

2. A computer according to claim 1 wherein the multiconnect storage means comprises a plurality of multiconnect element each operative to receive an output operand from a processor, store the received operand, and provide a stored operand as an input operand to a processor.

3. A computer according to claim 2 wherein the multiconnect elements are arranged in a matrix of rows and columns, the elements of each row being associated with an output from a different one of the processors such that an output operand from a processor is stored in all the elements of the associated row, and the elements in each column being associated with an input to a different one of the processors such that a processor receives an input operand from any of the elements in the associated column.

4. A computer system for performing one or more iterations of a loop of instructions having a branch, the system comprising:
a processing unit having a plurality of processors for performing operations on input operands and providing output operands;
a multiconnect unit for storing operands at addressable locations and for providing said input operands from source addresses and for storing said output operands at destination addresses; and instruction unit for
specifying for each instruction and each iteration of said loop of instructions operations to be performed by said processing unit,
determining for a given iteration whether any of the instructions is a branch instruction;
enabling different ones of the processors as a function of whether a branch instruction is to be executed whereby which of the operations are actually executed during a given iteration is determined by whether a branch instruction is to be executed during that iteration, and
specifying source address offsets and destination address offsets relative to a modifiable pointer; and invariant addressing means for providing said modifiable pointer and for combining said address offsets to form said source addresses and said destination addresses in said multiconnect unit.

5. A computer system according to claim 4 wherein the invariant addressing means includes means for storing one of the output operands at a first multiconnect address specified by a first address offset and a first value of said modifiable pointer during one iteration and means for accessing said output operand as an input operand from said multiconnect address specified by a combination of said second address offset and a second value of said modifiable pointer during another iteration of said loop.

6. A computer system for performing one or more iterations of a loop of instructions, the system comprising:
a processing unit having a plurality of processors for performing operations on input operands and providing output operands;
a multiconnect unit for storing operands at addressable locations and for providing said input operands from source addresses and for storing said output operands at destination addresses;
an instruction unit for specifying for each instruction and each iteration of said loop of instructions operations to be performed by said processing unit, enabling different ones of the processors as a function of whether a branch instruction is to be executed, and specifying source address offsets and destination address offsets relative to a modifiable pointer;
invariant addressing means for providing said modifiable pointer and for combining said address offsets to form said source addresses and said destination addresses in said multiconnect unit; and
iteration control means for controlling which operations are active in each instruction during each iteration of said loop.

7. A computer system according to claim 6 wherein the invariant addressing means includes means for storing one of the output operands at a first multiconnect address specified by a first address offset and a first value of said modifiable pointer during one iteration and means for accessing said output operand as an input operand from said multiconnect address specified by a combination of said second address offset and a second value of said modifiable pointer during another iteration of said loop.

* * * * *

UNITED STATES PATENT AND TRADEMARK OFFICE
CERTIFICATE OF CORRECTION

PATENT NO. : 5,226,128
DATED      : July 6, 1993
INVENTOR(S) : Bantwal R. Rau et al.

It is certified that error appears in the above-indentified patent and that said Letters Patent is hereby corrected as shown below:

Column 4, line 68 and throughout the patent, "$\bar{o}^{-k,1}_n,\ldots,\bar{o}^{-k,1}_{(N-1)}$" should read --- $\bar{o}^{-k,1}_0, \bar{o}^{-k,1}_1, \bar{o}^{-k,1}_2, \ldots, \bar{o}^{-k,1}_n, \ldots, \bar{o}^{-k,1}_{(N-1)}$;

Column 7, line 17, "at &:he same time", should read -- "at the same time";

Column 11, lines 49-55, "(i)" should read "($\bar{i}$) =";

Column 12, lines 1-8, " (i)" should read -- "($\bar{i}$)";

Column 12, line 65, "Multiconnect elements operands", should read --- "The multiconnect elements 34 provide input operands";

COlumn 13, Line 3, "multiconnect input" should read -- "to multiconnect element input";

Signed and Sealed this

Twenty-sixth Day of April, 1994

*Attest:*

BRUCE LEHMAN

*Attesting Officer*  Commissioner of Patents and Trademarks